United States Patent
Wijayaratne et al.

(10) Patent No.: US 10,909,082 B2
(45) Date of Patent: Feb. 2, 2021

(54) SYSTEM AND METHOD FOR POLICY BASED SYNCHRONIZATION OF REMOTE AND LOCAL FILE SYSTEMS

(71) Applicant: Egnyte, Inc., Mountain View, CA (US)

(72) Inventors: Ravi Wijayaratne, San Jose, CA (US); Remus Koos, San Jose, CA (US); Ray White, San Jose, CA (US); Manish Marathe, San Jose, CA (US); Dmitry Tisnek, Poznan (PL); Harikesavan Krishnan, San Jose, CA (US); Amrit Jassal, Morgan Hill, CA (US)

(73) Assignee: Egnyte, Inc., Mountain View, CA (US)

( * ) Notice: Subject to any disclaimer, the term of this patent is extended or adjusted under 35 U.S.C. 154(b) by 0 days.

(21) Appl. No.: 16/539,925

(22) Filed: Aug. 13, 2019

(65) Prior Publication Data

US 2020/0073854 A1    Mar. 5, 2020

Related U.S. Application Data

(63) Continuation of application No. 14/805,226, filed on Jul. 21, 2015, now Pat. No. 10,380,076.

(Continued)

(51) Int. Cl.
G06F 16/178    (2019.01)
G06F 16/16    (2019.01)
(Continued)

(52) U.S. Cl.
CPC ........... *G06F 16/178* (2019.01); *G06F 16/16* (2019.01); *G06F 16/176* (2019.01); *H04L 67/1095* (2013.01)

(58) Field of Classification Search
CPC ...... G06F 16/178; G06F 16/16; G06F 16/176; H04L 67/1095
See application file for complete search history.

(56) References Cited

U.S. PATENT DOCUMENTS

| 5,388,255 A | 2/1995 | Pytlik et al. |
| 5,832,211 A | 11/1998 | Blakley, III et al. |

(Continued)

OTHER PUBLICATIONS

U.S. Appl. No. 15/093,909, Office Action dated Mar. 5, 2019.

(Continued)

*Primary Examiner* — Irete F Ehichioya
*Assistant Examiner* — Antonio J Caiado
(74) *Attorney, Agent, or Firm* — Larry E. Henneman, Jr.; Henneman & Associates, PLC

(57) ABSTRACT

A method for synchronizing a local file system (LFS) and a remote (cloud) file system (RFS) includes the step of storing events indicative of differences between the LFS and the RFS, where the events are associated with file system objects of the LFS and RFS. The method further includes the steps of prioritizing the events, generating file system operations for the events based at least in part on the prioritization of the events, and performing at least some of the file system operations to synchronize the LFS and RFS. Prioritizing the events includes defining a plurality of service classes (e.g., based on type of event, event attribute, etc.), assigning a priority to each of the service classes, and assigning each event to one of said service classes. Systems are also described. The invention allocates limited synchronization resources based on a predefined policy to synchronize important file system objects sooner.

20 Claims, 17 Drawing Sheets

Related U.S. Application Data

(60) Provisional application No. 62/027,201, filed on Jul. 21, 2014.

(51) Int. Cl.
*G06F 16/176* (2019.01)
*H04L 29/08* (2006.01)

(56) References Cited

U.S. PATENT DOCUMENTS

| | | |
|---|---|---|
| 6,847,993 B1 | 1/2005 | Novaes et al. |
| 7,100,195 B1 | 8/2006 | Underwood |
| 7,660,830 B2 | 2/2010 | Ordille |
| 2003/0153302 A1 | 8/2003 | Lewis et al. |
| 2006/0247964 A1 | 11/2006 | Baturytski et al. |
| 2006/0293034 A1 | 12/2006 | Armstrong |
| 2011/0066668 A1 | 3/2011 | Guarraci |
| 2012/0179653 A1 | 7/2012 | Araki et al. |
| 2013/0138608 A1 | 5/2013 | Smith |
| 2014/0006354 A1 | 1/2014 | Parkison et al. |
| 2014/0372376 A1 | 12/2014 | Smith et al. |
| 2014/0379647 A1* | 12/2014 | Smith ............... G06F 16/178 707/624 |
| 2015/0326454 A1 | 11/2015 | Geis |
| 2015/0347189 A1* | 12/2015 | Steffen ............... G06F 9/4881 718/103 |
| 2015/0370827 A1* | 12/2015 | Parkison ............ G06F 11/2094 707/626 |
| 2018/0150476 A1 | 5/2018 | Koos et al. |
| 2018/0150632 A1 | 5/2018 | Sharma et al. |

OTHER PUBLICATIONS

U.S. Appl. No. 15/179,459, Office Action dated Nov. 6, 2018.
U.S. Appl. No. 15/179,459, Office Action dated May 15, 2019.
U.S. Appl. No. 15/179,459, Office Action dated Feb. 10, 2020.
U.S. Appl. No. 15/388,038, Office Action (Restriction Requirement) dated Apr. 17, 2019.
U.S. Appl. No. 15/388,038, Office Action dated Jul. 18, 2019.
U.S. Appl. No. 15/808,425, Office Action dated Jan. 28, 2020.

* cited by examiner

Last Valid Sync Database 628

SYSTEM AND METHOD FOR POLICY BASED SYNCHRONIZATION OF REMOTE AND LOCAL FILE SYSTEMS

RELATED APPLICATIONS

This application is a continuation of U.S. application Ser. No. 14/805,226 (now U.S. Pat. No. 10,380,076), filed on Jul. 21, 2015 by the same inventors, which claims the benefit of U.S. Provisional Patent Application Ser. No. 62/027,201, filed on Jul. 21, 2014 by at least one common inventor, each of which is incorporated by reference herein in its entirety.

BACKGROUND OF THE INVENTION

Field of the Invention

This invention relates generally to computer systems, and more particularly to cloud file storage systems. Even more particularly, this invention relates to synchronizing a local file system and a cloud file system stored remotely from the local file system.

Description of the Background Art

Cloud computing systems are known. In cloud computing systems, computing and storage services are provided to remote clients over a wide area network such as the Internet. In the case of storage, a client's local files can be stored on the cloud and accessed by the client remotely.

Often a client's file system will exist both in the client's local storage device (e.g., a hard drive, network attached storage (NAS) device, etc.) and in the cloud. For example, a client might store a backup copy of its local file system in the cloud. Doing so is beneficial from the standpoint that the client has a backup copy of its file system. However, any benefit of the backup is negated as more and more changes are made to the local file system. Thus, it becomes a burden on the client to make sure the file system stored on the cloud is up to date. It is common for the file system on the cloud to be significantly older than the local file system, putting the local file system at risk if it is damaged.

For large file systems, the time needed to copy the local file system to the cloud, or vice versa, can be very long, for example, on the order of days to more than a week. Often the cloud file system and/or the local file system will be unavailable during this time. This is very problematic for clients, especially when files are needed sooner e.g., for remote presentations, collaboration with others, etc. File system downtime can also repeat if future copies of the file system(s) need to be made.

What is needed, therefore, is a system and method that facilitates efficiently synchronizing a client's local file system with its file system on the cloud. What is also needed is a system and method that facilitates such synchronization in near real time and provides access to the synchronized file systems quickly.

SUMMARY

The present invention overcomes the problems associated with the prior art by providing a system and method for synchronizing local and remote (cloud) file systems using a policy-based allocation of synchronization resources. In particular, events that need to be applied to synchronize the local and remote file systems are assigned to different event service classes which have different synchronization priorities. Quotas of synchronization bandwidth can be assigned to the different service classes to ensure that high-priority data is synchronized first without having to wait for low-priority events (e.g., transfer of large, older files, etc.) to complete. According to the invention, clients have almost immediate access to their namespace on the local and remote file systems while the synchronization of data is prioritized and fulfilled. The policy-based synchronization provided by the invention provides particularly important advantages where large amounts of data are being copied to a file system, for example, during initial synchronization of the local and remote file systems.

A method for synchronizing a local file system (LFS) and a remote file system (RFS) includes the steps of storing events indicative of differences between file system objects of the LFS and the RFS, prioritizing the events, generating file system operations for the events based at least in part on the prioritization of the events, and performing at least some of the file system operations to facilitate synchronization of the LFS and the RFS.

A particular method of prioritizing the events includes the steps of defining a plurality of service classes, assigning a priority to each of the service classes, and assigning each of the events to one of the service classes. Priorities can be assigned to the service classes by assigning a (positive) quota of synchronization resources (e.g., based on processor time, number of events, etc.) to each service class, such that the step of generating file system operations is carried out according to the assigned quotas.

The service classes can be defined, for example, based on event type. Accordingly, a particular method includes the steps of generating steady state synchronization (SSS) events and assigning the SSS events to a first service class having a first priority. SSS events are generated in response to changes made by a user to the LFS and/or RFS, and can be generated locally or retrieved from a remote system storing the RFS. More particularly, the method can also include the steps of receiving a metadata snapshot of at least a portion of the RFS, generating a metadata snapshot of a corresponding portion of the LFS, comparing the snapshots to detect differences between the LFS and RFS, generating rescan synchronization (RS) events based on the differences, and assigning the RS events to a lower priority than the first service class (SSS events). The SSS and/or the RS events can be further prioritized within their respective service classes, e.g., by attributes of the associated file system objects.

The plurality of service classes themselves can also be defined based on attributes of the file system objects associated with the events. Such attributes include, but are not limited to, last modified time, ownership, size, and file type/extension.

A particular method also accounts for causal relationships that exist between events within different service classes. For example, the step of generating file system operations can further include the steps of receiving a first event assigned to a first service class having a first priority, searching the events assigned to a different service class having a different priority, identifying a second event assigned to the different service class that is related to the first event, and generating file system operations based on the first event and the second event even though the second event is assigned to a lower-priority service class.

When valid synchronizations occur, a particular method includes the step of storing a valid synchronization record each time a file system object is successfully synchronized between RFS and LFS. A valid sync record can be stored in a files table when the successfully synchronized file system object is a file, and the valid sync record can be stored in a folders table when the successfully synchronized file system object is a folder.

The invention is also directed to non-transitory, electronically-readable storage media that store code for causing an electronic device to perform methods of the invention. The term "non-transitory" is intended to distinguish storage media from transitory electrical signals. However, rewritable memories are considered to be "non-transitory".

A local file storage system that is operative to synchronize an LFS and an RFS is also disclosed. The local file storage system includes memory containing at least one database storing events indicative of differences between the LFS and the RFS, an event processor operative to generate file system operations for the events, an admissions controller operative to prioritize the events and to provide the events to the event processor based at least in part on their priorities, and an operations handler operative to cause the file system operations to be applied to at least one of the LFS and the RFS to facilitate synchronization of the LFS and the RFS. The system, therefore, includes a means for prioritizing the events and a means for generating file system operations based on the prioritized events.

In a particular embodiment, the admissions controller assigns each event to one of a plurality of service classes, and each service class is assigned a priority for synchronization. Each service class is assigned a (positive) quota of synchronization bandwidth (e.g., quota of processor time, number of events, etc.) according to its priority, such that the admissions controller provides the events to the event processor according to the quotas.

The services classes can be defined based on event type, for example, where the admissions controller assigns SSS events to a higher priority service class than RS events. Local SSS events can be generated by a data monitor that monitors the LFS for changes by a user. Remote SSS events can be retrieved from the system storing the RFS by a synchronizer. The synchronizer can also generate RS events and is operative to receive a metadata snapshot of at least a portion of the RFS, generate a metadata snapshot of a corresponding portion of the LFS, compare the snapshots to detect differences between the LFS and RFS, and generate RS events based on the differences. In a more particular embodiment, the SSS and/or the RS events can be further prioritized within their respective service classes, for example, according to attributes of the associated file system objects.

Service classes themselves can also be defined based on attributes of file system objects. Attributes of file system objects include, but are not limited to, file type/extension, last modified time, ownership, and size.

The system also accounts for causal relationships that can exist between events within different service classes. For example, according to one particular embodiment, for a first event assigned to a first service class, the admissions controller is further operative to identify a second event assigned to a second service class that is related to the first event and provide the first event and the second event to the event processor regardless of service class.

In another particular embodiment, the memory of the system includes a last valid sync (LVS) database operative to store an LVS record each time one of the file system objects is successfully synchronized. The LVS database can include a files table and a folders table as discussed above.

The invention also relates to a non-transitory, electronically-readable storage medium having a data structure embodied therein defining a synchronization database. The database includes a folder table and a file table where the folder table includes a plurality of folder records associated with folders of a file system, and the file table includes a plurality of file records associated with files of the file system. Each of the folder records includes a first field storing data representing a folder identifier uniquely identifying a folder of the file system, a second field storing data defining a file system path associated with the folder, and a third field storing data defining a synchronization status of the folder between the file system and a remote file system. Additionally, each file record includes a first field storing data representing a file identifier uniquely identifying a file of the file system, a second field storing data representing a particular folder identifier associated with a particular one of the plurality of folder records, and a third field storing data defining a synchronization status of the file between the file system and the remote file system. The particular folder identifier indicates the folder in which the file is located in the file system.

BRIEF DESCRIPTION OF THE DRAWINGS

The present invention is described with reference to the following drawings, wherein like reference numbers denote substantially similar elements.

DETAILED DESCRIPTION

Figure 1:
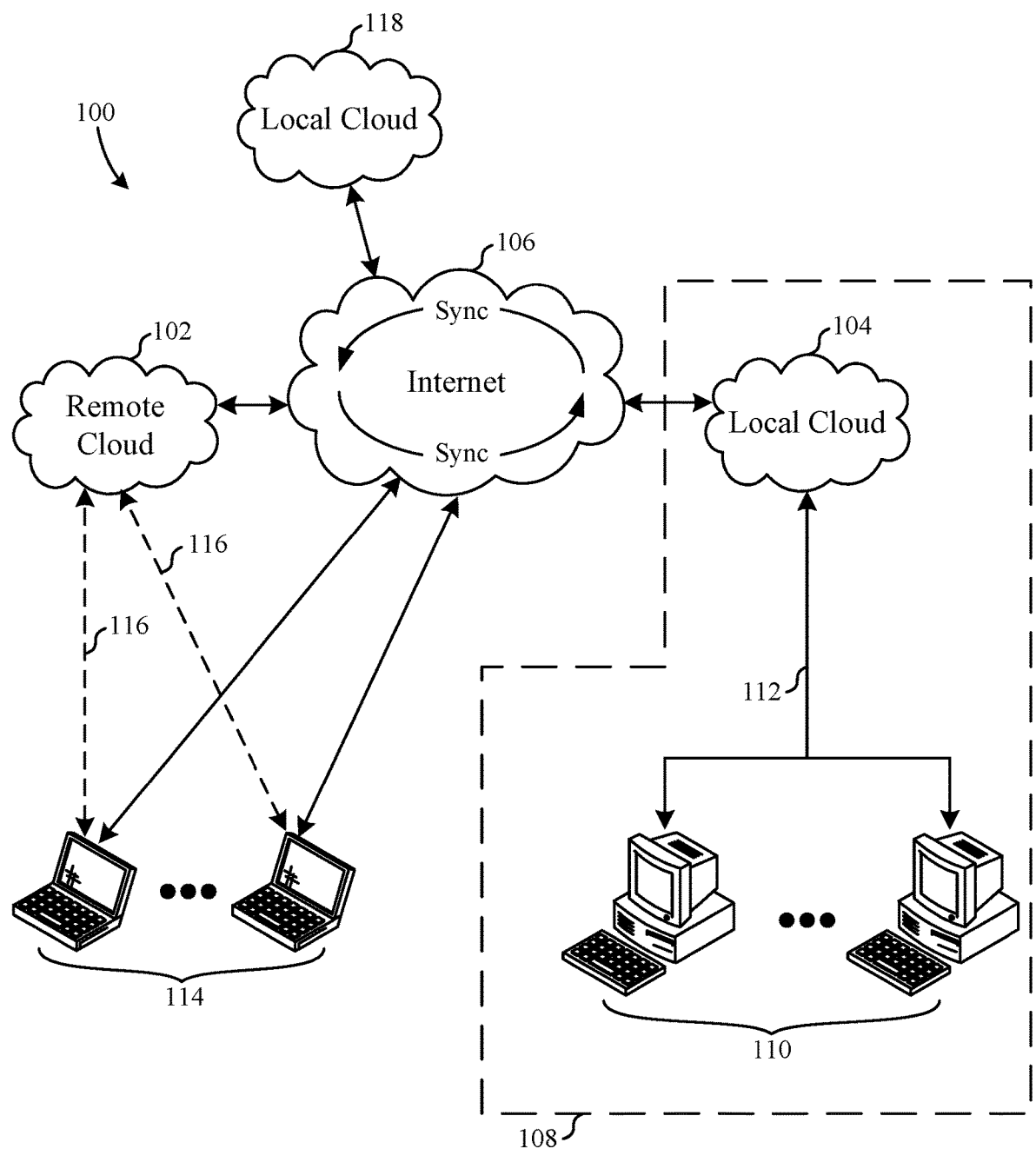
FIG. 1 is a diagram of a cloud computing system.

The present invention overcomes the problems associated with the prior art by providing a system and method for synchronizing local and remote (cloud) file systems using a policy-based allocation of synchronization resources. In the following description, numerous specific details are set forth (e.g., particular data structures, specific ways to process file system events, etc.) in order to provide a thorough understanding of the invention. Those skilled in the art will recognize, however, that the invention may be practiced apart from these specific details. In other instances, details of well-known computing practices and components have been omitted, so as not to unnecessarily obscure the present invention.

FIG. 1A shows a cloud computing system 100 to include a remote cloud server 102 and a local cloud server 104, which communicate and are synchronized via the Internet 106. Local cloud 104 can be hosted, for example, by a file server in an office 108 and is, therefore, sometimes referred to as an office local cloud (OLC). Local users 110 can access cloud files by directly accessing files/objects stored on local cloud 104, via a local network 112. Remote users 114 can access cloud files by accessing files/objects stored on remote cloud 102, via Internet 106, or via some other connection 116 with cloud server 102. The local cloud server 104 is bi-directionally synchronized with the remote cloud server 102 to provide local and remote data access and remote data security.

Where a client has multiple offices, as indicated by local cloud server 118, the local file systems of both local cloud 104 and local cloud 118 can be synchronized with remote cloud server 102. It should also be understood that remote cloud 102 can also store and synchronize file systems for other clients as well. The synchronization processes of the present invention will hereinafter be described with reference to local cloud 104 and remote cloud 102, but could be equally applied between local cloud 118 and remote cloud 102.

With reference to FIG. 2, file system synchronization is the process of making a remote file system (RFS) 202 stored on remote cloud 102 and a local file system (LFS) 204 stored on local cloud 104 identical. RFS 202 and LFS 204 are each defined by metadata (defining the file system's namespace) and data. Accordingly, after synchronization, the namespace (metadata) and data of RFS 202 will also be stored in the LFS 204, and vice versa.

Figure 2A:
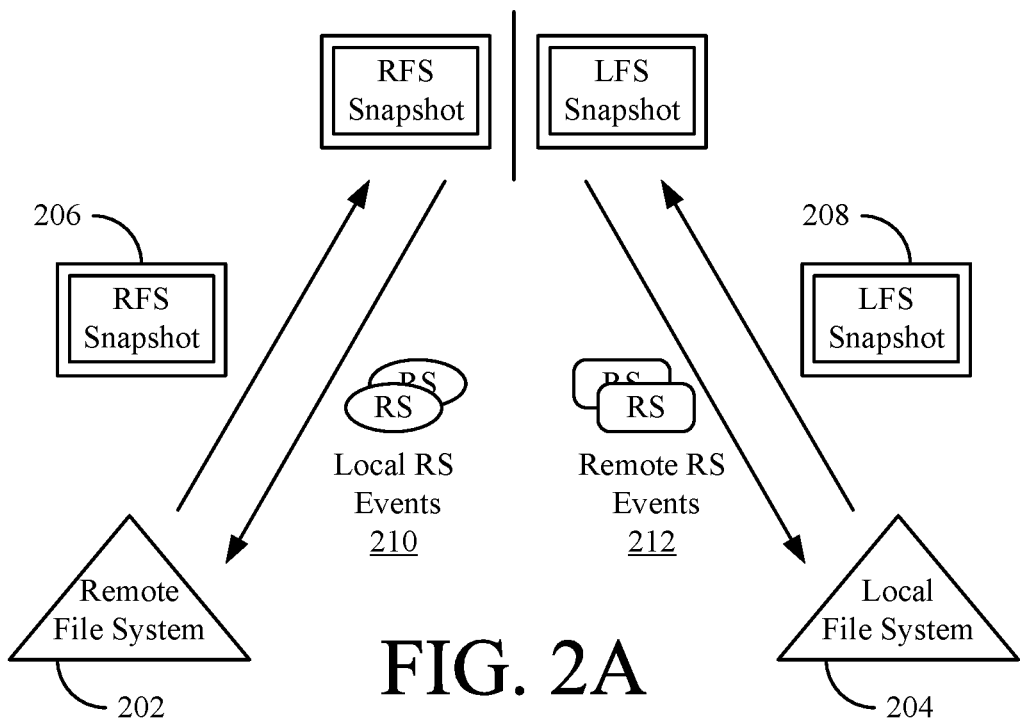
FIG. 2A illustrates a rescan synchronization method of synchronizing a remote file system and a local file system.

FIG. 2A illustrates a rescan synchronization (RS) method of synchronizing RFS 202 and LFS 204 according to the invention. Briefly, for a rescan synchronization, metadata snapshots 206 and 208 of the RFS 202 and LFS 204, respectively, are obtained at time $T_S$. Snapshots 206 and 208 are compared and the differences are then used to generate local RS events 210 and remote RS events 212 which are applied to the RFS 202 and the LFS 204, respectively. Local RS events 210 represent actions that need to be applied to RFS 202 to synchronize its metadata and/or data with LFS 204. Remote RS events 212 represent actions that need to be applied to LFS 204 to synchronize its metadata and/or data with RFS 202. When applied, the local and remote RS events 210 and 212 will bring RFS 202 and LFS 204 into synchronization as of time $T_s$.

A full file system (FFS) synchronization is a type of snapshot-based RS that is used to synchronize LFS 204 and RFS 202 for the first time. As a result of FFS synchronization, the LFS 204 is initially copied to remote cloud 102 and stored as RFS 202, for example, when a client opens an account with a remote cloud service provider. During the FFS synchronization, the LFS and RFS snapshots are used to generate local and remote RS events that are applied to synchronize RFS 202 and LFS 204. The FFS synchronization also causes a last valid synchronization (LVS) database to be generated, which will be discussed in more detail below. The LVS database stores extended attributes about every file system object (e.g., files and folders) that has been successfully synchronized on the LFS 204 and RFS 202.

After the initial FFS synchronization, a full rescan synchronization (FRS) process can be used to re-synchronize the entire LFS 204 and RFS 202. During an FRS, new metadata snapshots of LFS 204 and RFS 202 are created at a new time $T_S$, and new local and remote RS events are generated that will bring the LFS 204 and RFS 202 back into synchronization. The FRS is similar to the FFS process, except that file system objects that already exist on the LFS 204 and RFS 202 and that have not been modified (according to the data stored in the LVS database) do not need to be synchronized again. Accordingly, the LVS database speeds up synchronization under FRS. Finally, a limited rescan synchronization (LRS) is similar to the FRS, but is only based on partial metadata snapshots (e.g., metadata snapshots for a particular path and child file system objects, etc.) of the LFS 204 and RFS 202. The LVS database improves efficiency in the LRS also.

The snapshot-based rescan synchronization processes described above are very CPU and memory intensive for file systems with large namespaces. Completing snapshot-based rescan synchronizations can take a very long time to complete (e.g., several days), particularly in the case of an FFS and FRS.

Figure 2B:
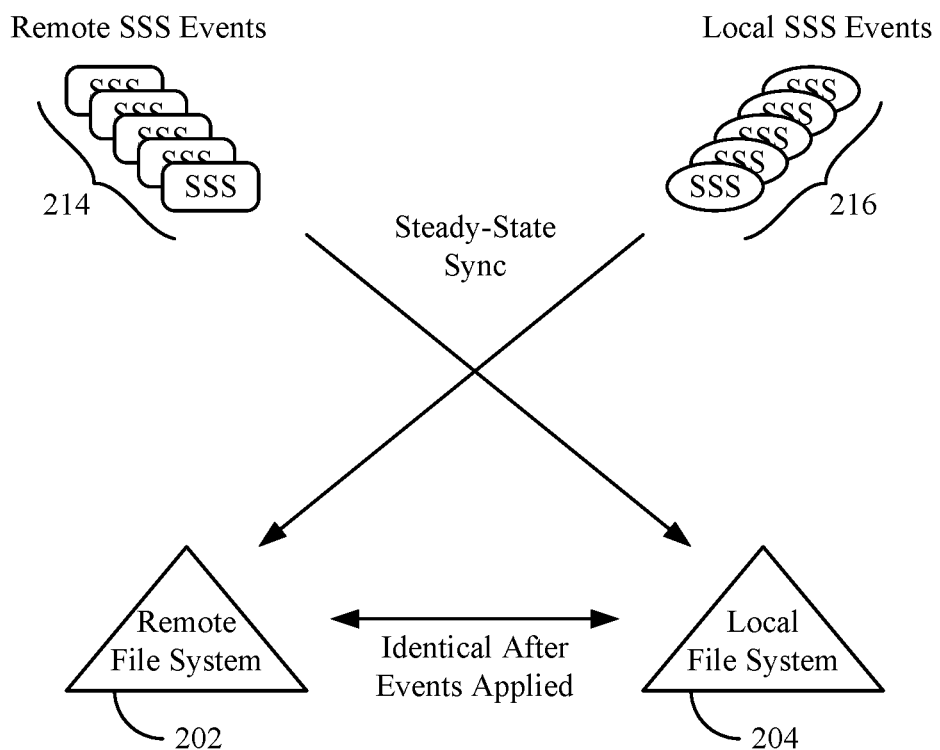
FIG. 2B illustrates a steady-state method of synchronizing a remote file system and a local file system.

FIG. 2B illustrates an event-based, steady-state synchronization (SSS) method according the invention. This method is based on monitoring and collecting all of the changes ("events") made to LFS 204 (e.g., by local users 110) and all of the changes made to RFS 202 (e.g., remote users 116) beginning at some point in time, $T_1$, through a later time, $T_2$. Changes made to RFS 202 and to LFS 204 are called remote SSS events 214 and local SSS events 216, respectively. The remote SSS events 214 and local SSS events 216 are then processed such that appropriate file system operations are generated and applied to RFS 202 and LFS 204 to synchronize RFS 202 and LFS 204 as of time $T_2$. The time period between $T_1$ and $T_2$ is called an event synchronization period.

The steady-state synchronization (SSS) process of FIG. 2B enables RFS 202 and LFS 204 to remain synchronized in near real-time as RFS 202 and LFS 204 are synchronized for consecutive event synchronization periods. The steady-state synchronization process is also easily scalable and uses resources more efficiently than relying solely on the snapshot-based rescan synchronization methods of FIG. 2A.

Figure 3:
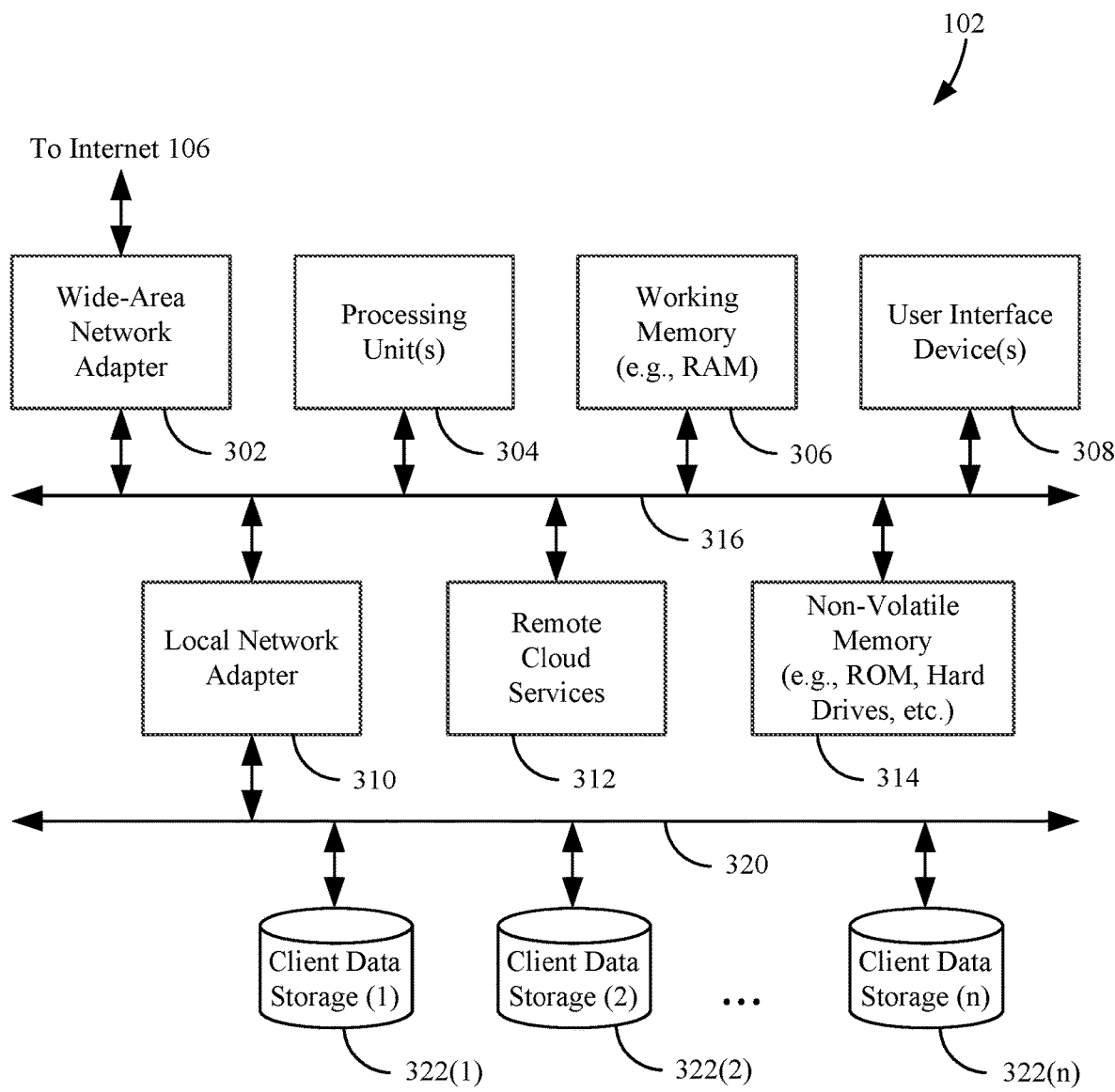
FIG. 3 is a block diagram of a remote file storage server.

FIG. 3 is a block diagram of remote cloud server 102. Remote cloud server 102 includes a wide-area network adapter 302, one or more processing units 304, working memory 306, one or more user interface devices 308, a local network adapter 310, a remote cloud services component 312, and non-volatile memory 314, all intercommunicating via an internal bus 316. Processing units(s) 304 impart functionality to remote cloud server 102 by executing code stored in any or all of non-volatile memory 314, working memory 306, and remote cloud services 312. Remote cloud services 312 represents hardware, software, firmware, or some combination thereof, that provides the synchronization functionality described herein.

Wide area network adapter 302 provides a means for remote cloud server 102 to communicate with remote users 114 and local cloud 104 via Internet 106. Local network adapter 310 provides a means for accessing a plurality of data storage devices 322(1-n), via a private network 320. Clients' files are stored in and retrieved from data storage devices 322(1-n) as needed. Additional data storage devices 322(n+) can be added as needed to provide additional storage capacity. In this example embodiment, data storage devices 322(1-n) are network attached storage (NAS) devices, but any suitable type of storage device can be used.

Cloud-based object storage infrastructures are further described in U.S. Publication No. 2014/0149794 A1, dated May 29, 2014 by Shetty et al. and entitled "System And Method Of Implementing An Object Storage Infrastructure For Cloud-Based Services", which is incorporated herein by reference in its entirety. Furthermore, permission management frameworks for cloud servers is described in U.S. Publication No. 2014/0149461 A1, dated May 29, 2014 by Wijayaratne et al. and entitled "Flexible Permission Management Framework For Cloud Attached File Systems", which is also incorporated herein by reference in its entirety.

Figure 4:
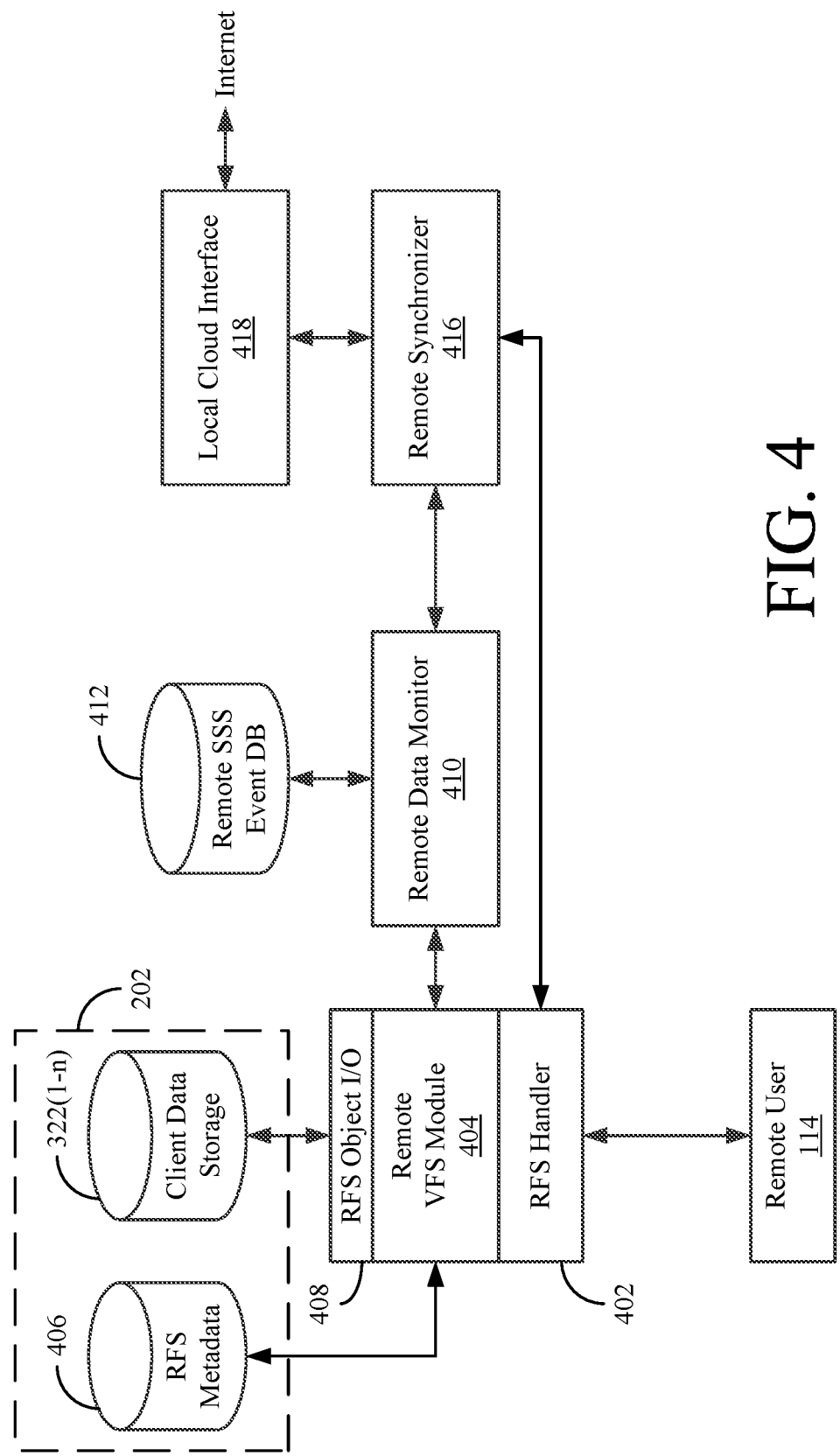
FIG. 4 is a relational diagram of the functional aspects of the remote cloud storage server of FIG. 3.

FIG. 4 is a relational diagram showing the functional aspects of remote cloud server 102. In the illustrated embodiment, the functional aspects are provided by remote cloud services 312 but could be distributed across other service modules or even other machines.

Remote user 114 is a device and/or process used to access files in RFS 202 via an RFS handler 402. Remote users 114 connect with RFS handler 402 either via the Internet 106 or via connections 116 (FIG. 1). RFS handler 402 represents an interface/protocol by which remote users 114 can access and modify RFS 202. RFS handler 402 represents an interface/protocol by which remote users 114 can access and modify RFS 202. For example, RFS handler 402 can be an interface implementing HTTP, WebUI, WebDAV, RESTful application program interfaces (APIs) and/or FTP, an interface compatible with a mobile application (e.g., an application running on a smartphone, tablet, etc.), etc. Responsive to a remote user 114, RFS handler 402 calls remote virtual file system (VFS) module 404.

It is worth noting here that RFS 202 includes both an RFS metadata database 406 and data storage devices 322(1-n). Metadata database 406 stores metadata (e.g., data defining virtual files and virtual folders, permissions, etc.) that describes a hierarchical, virtual file system that remote client 114 can use to access file system objects and make changes to RFS 202. Data storage devices 322(1-n) store data files that are associated with the virtual file system objects defined by the metadata. The metadata in database 406 stores paths (or some other identifier) to the associated data files on data storage devices 322(1-n), so that file system objects can be accessed, updated, and created on devices 322(1-n) in accordance with changes made by the remote client 114 to virtual RFS 202.

Remote VFS module 404 (e.g., a software plugin) provides remote user 114 with file and folder access to RFS 202. Remote VFS module 404 intercepts the file system calls coming from remote user 114 via RFS handler 402 and enforces cloud permissions on file system access. If access is permitted, remote VFS module 404 utilizes metadata stored in RFS metadata database 406 to provide remote user 114 with a hierarchical virtual file system view of the namespace (e.g., a directory tree view of folders and files) via which the remote user 114 can access and make changes to local file system objects. When a data file needs to be uploaded to, downloaded from, or deleted from client data storage devices 322(1-n), remote VFS module 404 utilizes RFS object I/O module 408 to facilitate the data file operation.

RFS object I/O module 408 manages the I/O subsystem for organized data file storage and access on data storage devices 322(1-n). Responsive to VFS module 404, RFS object I/O module 408 downloads associated data files from, uploads associated data files to, and deletes associated data files from data storage devices 322(1-n). I/O module 408 also provides and receives the requisite files from VFS module 404. Similarly, VFS module 404 provides data files to, and retrieves data files from, remote client 114 as needed via RFS handler 402.

RFS 202 can be viewed as including a control plane and a data plane. The control plane includes the metadata in RFS metadata database 406, which the remote user 114 can access and change via the virtual file system and remote VFS module 404. The data storage devices 322(1-n) represent the data plane, which the remote user 114 does not have direct access to or control over. Rather, changes are propagated to the data plane based on changes that the client makes to the virtual file system.

An "event" represents a change to a file system. Stated another way, an "event" represents a difference between RFS 202 and LFS 204. Changes made by a client to RFS 202 specifically are referred to as "remote SSS events", whereas changes made to the LFS 204 by a client will be referred to as "local SSS events". In the present embodiment, remote SSS events originate as changes to the file system namespace (metadata) stored in RFS metadata database 406, for example, as a result of remote user 114 interacting with the virtual file system.

Events include file events and folder events. File events include creating a file (CREATE), updating a file (UPDATE), deleting a file (UNLINK), and renaming a path (RENAME). Because RENAME operates on the path, RENAME can represent both rename events and move events. Additionally, RENAME events are represented from both the source and destination path perspectives to facilitate event processing from both perspectives. A file RENAME event from the source perspective is referred to as RENAME_SRC_FILE (RSF) and a file RENAME event from the destination perspective is referred to as RENAME_DST_FILE (RDF). Folder events include creating a folder (MKDIR), removing a folder (RMDIR), and renaming (RENAME) a folder. The folder rename event is represented from both the source perspective (RENAME_SRC_DIR, "RSD") and from the destination perspective (RENAME_DST_DIR, "RDD") and cover rename and move events.

Remote VFS module 404 facilitates event-based, steady state synchronization between RFS 202 and LFS 204 by trapping the remote SSS events as they occur (i.e., when changes are made to the virtual file system by a user/client) and providing remote SSS event information to a remote data monitor 410. In particular, remote VFS module 404 monitors I/O requests from remote user 114 and provides remote SSS event information to remote data monitor 410 when remote VFS module 404 receives an I/O request that changes the remote virtual file system defined by RFS metadata 406.

For each remote SSS event, remote data monitor 410 receives the remote SSS event information from remote VFS module 404, and then records the remote SSS event in a remote SSS event database 412. Optionally, remote data monitor 410 can filter irrelevant and/or redundant remote SSS events (e.g., by implementing phase 0-1 processing described below, etc.) from database 412. Additionally, remote data monitor 410 can notify a remote synchronizer 416 of the occurrence of remote SSS events and can receive synchronization commands from remote synchronizer 416. For example, responsive to a request for remote SSS events from remote synchronizer 416, remote data monitor 410 can retrieve the requested remote SSS events from remote SSS event database 412 (e.g., for an event synchronization period) and provide them to remote synchronizer 416. Remote data monitor 410 can also periodically delete the remote SSS events from remote event database 412, for example, once the events are provided to remote synchronizer 416 or following a command from remote synchronizer 416 after successful event synchronization.

Remote SSS event database 412 provides storage for the records of a plurality of remote SSS events. These remote SSS events are maintained according to a scalable relational database structure. Records of remote SSS events are stored in remote SSS event database 412 in chronological order as events occur. However, remote SSS event database 412 can return remote SSS events chronologically, according to the hierarchy of the virtual file system, and/or according to some other method as desired.

Remote synchronizer 416 controls and coordinates the synchronization process between remote cloud 102 and local cloud 104 from the remote cloud side. For example, remote synchronizer 416 can receive commands from local cloud 104, via internet 106 and a local cloud interface 418, to initiate synchronization. In response, remote synchronizer 416 can request remote SSS events from RFS data monitor 410, receive the remote SSS events, and provide the remote SSS events to local cloud 104 via local cloud interface 418. In other embodiments, remote synchronizer 416 can periodically provide the remote SSS events to local cloud 104 without the events being requested by local cloud 104. In still other embodiments, remote synchronizer 416 can contact local cloud 104 via interface 418 and initiate the synchronization process, for example, in response to remote synchronizer 416 receiving notification of a remote event from remote data monitor 410 or a command from a remote cloud administrator.

Remote synchronizer 416 also facilitates the different snapshot-based RS processes discussed above in FIG. 2A. For example, responsive to a snapshot request received via local cloud interface 418, remote synchronizer 416 is operative to request the appropriate snapshot of RFS 202 from remote data monitor 410. For example, for an FFS or FRS, remote synchronizer 416 would request a metadata snapshot of (all or some of) the metadata for all paths defined by the RFS metadata 406. However, for an LRS, remote synchronizer 416 requests a snapshot of only the requested portion of RFS metadata 406, for example, for a particular path and child directories as of a particular time. In response, remote data monitor 410 queries VFS module 404 for the appropriate metadata snapshot. VFS module 404 uses RFS metadata 406 to prepare the appropriate RFS metadata snapshot and provides the snapshot to remote data monitor 410. Remote data monitor 410, in turn, provides the metadata snapshot to remote synchronizer 416, and remote synchronizer 416 provides the snapshot to the local cloud server 104 via local cloud interface 418. Optionally, remote synchronizer 416 could communicate directly with VFS module 404 or RFS metadata database 406 to obtain the snapshot.

The RFS metadata snapshot can be in any convenient format (e.g., flat file, comma separated value, XML, JSON, etc.). In a particular embodiment, the RFS metadata snapshot is in flat file format (lines of text) with one object per line and tabs separating the object attributes in the line. Additionally, the RFS metadata snapshot can include all or only some metadata attributes for each file system object. File attributes that can be included in the RFS metadata snapshot include, but are not limited to, an entry identifier (facilitates multiple versions of files), path (e.g., display path), modification time, size, and checksum. Folder attributes that can be included in the RFS metadata snapshot include, but are not limited to, an entry identifier, path, and modification time.

Remote synchronizer 416 is also operative to receive file system operations and data for modifying RFS 202 from local cloud 104 via interface 418 and to provide those file system operations and data to RFS handler 402. RFS handler 402, in turn, causes the file system operations and data to be applied to RFS 202. The file system operations represent changes associated with local SSS events or local RS events that are being applied to RFS 202 as part of the synchronization process according to the invention.

File system operations can include any file system operations that are recognized by the protocol(s) implemented by RFS handler 402 (e.g., upload, download, delete, move, create, rename, etc.). The file system operations make changes in RFS metadata database 406 and/or client data stores 322(1-n) as part of the synchronization process. For example, the file system operations can cause a file or folder to be created, deleted, renamed, or moved in the metadata virtual file system (namespace) defined by RFS metadata 406. As another example, the file system operations can also cause a file to be uploaded to, downloaded from, deleted from, moved, renamed, etc. in the client data stores 322(1-n). Other file system operations (e.g., attribute modifications, etc.) can also be implemented.

As indicated above, remote synchronizer 416 communicates with local cloud interface 418. Local cloud interface 418 is a means by which remote cloud server 102 can establish an internet connection with local cloud server 104 and intercommunicate as needed, for example, by complementary application program interfaces (APIs). In a particular embodiment, local cloud interface 418 maintains an open (always on) connection with local cloud 104 for efficient event-based synchronization.

Figure 5:
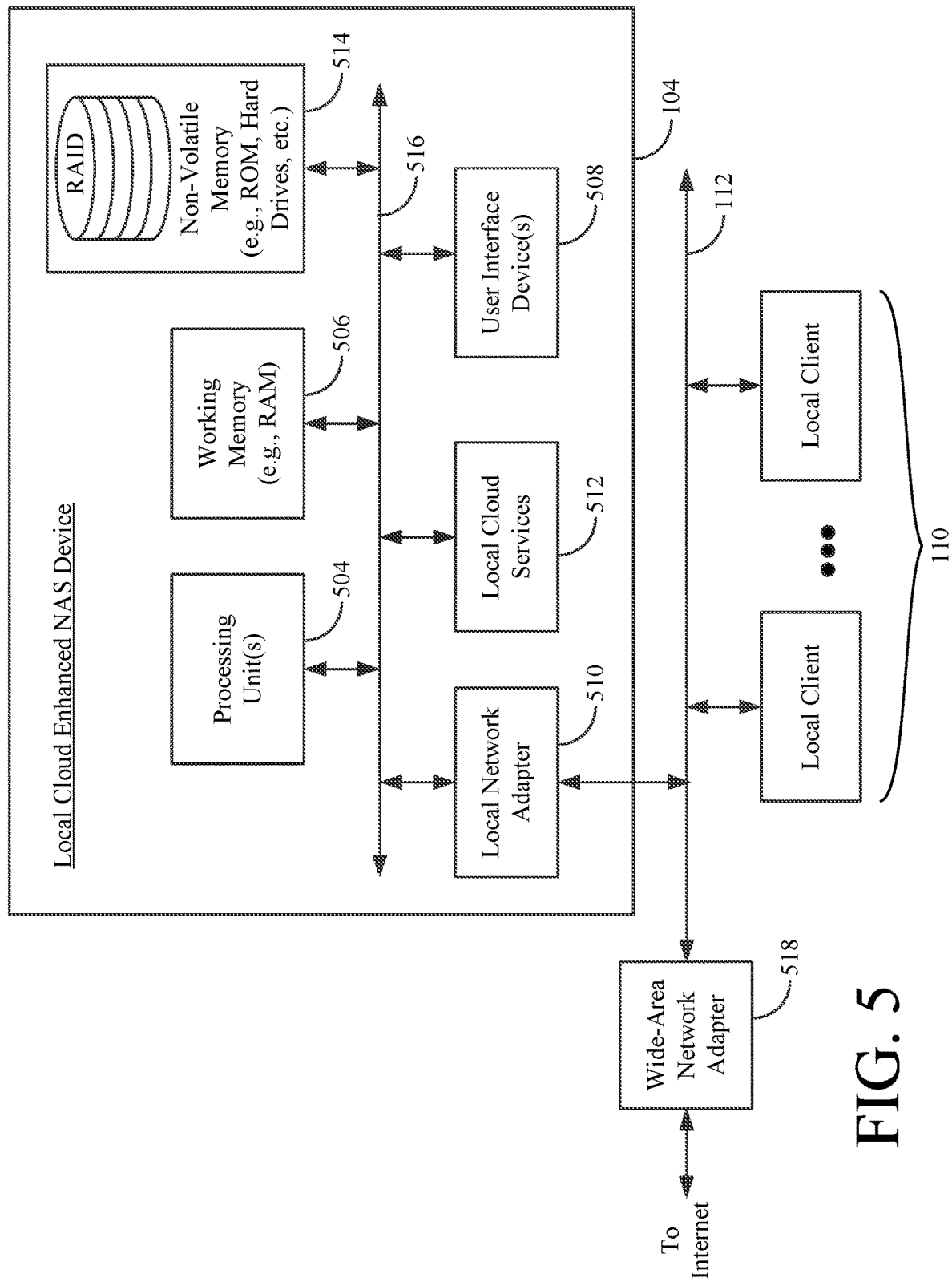
FIG. 5 is a block diagram of a local cloud storage server.

FIG. 5 is a block diagram showing local cloud server 104 in greater detail. In this particular embodiment, local cloud server 104 is an enhanced network attached storage (NAS) device that includes one or more processing units 504, working memory 506, one or more user interface devices 508, a local network adapter 510, a local cloud services component 512, and non-volatile memory 514, all intercommunicating via an internal bus 516. Processing units(s) 504 impart functionality to local cloud server 104 by executing code stored in any or all of non-volatile memory 514, working memory 506, and local cloud services 512. A wide-area network adapter 518 facilitates communication with remote cloud 102 (FIG. 1) via local network 112 and the Internet 106.

Non-volatile memory 514 also provides local file storage for client files/objects. By way of example, the nonvolatile memory 514 is shown to include (in addition to other types of memory) a set of hard drives arranged in a RAID configuration. The client's file system on the RAID drives can be accessed by local users 110 via local network 112, as is known in the art.

Local cloud services 512 represents hardware, software, firmware, or some combination thereof, that provides the synchronization functionality described herein. Local cloud services 512 also provide file storage and retrieval services to local users 110. The file storage functionality of local cloud services 512 will not be described in detail herein, except to the extent it relates to the synchronization aspects, so as not to unnecessarily complicate this disclosure.

Figure 6:
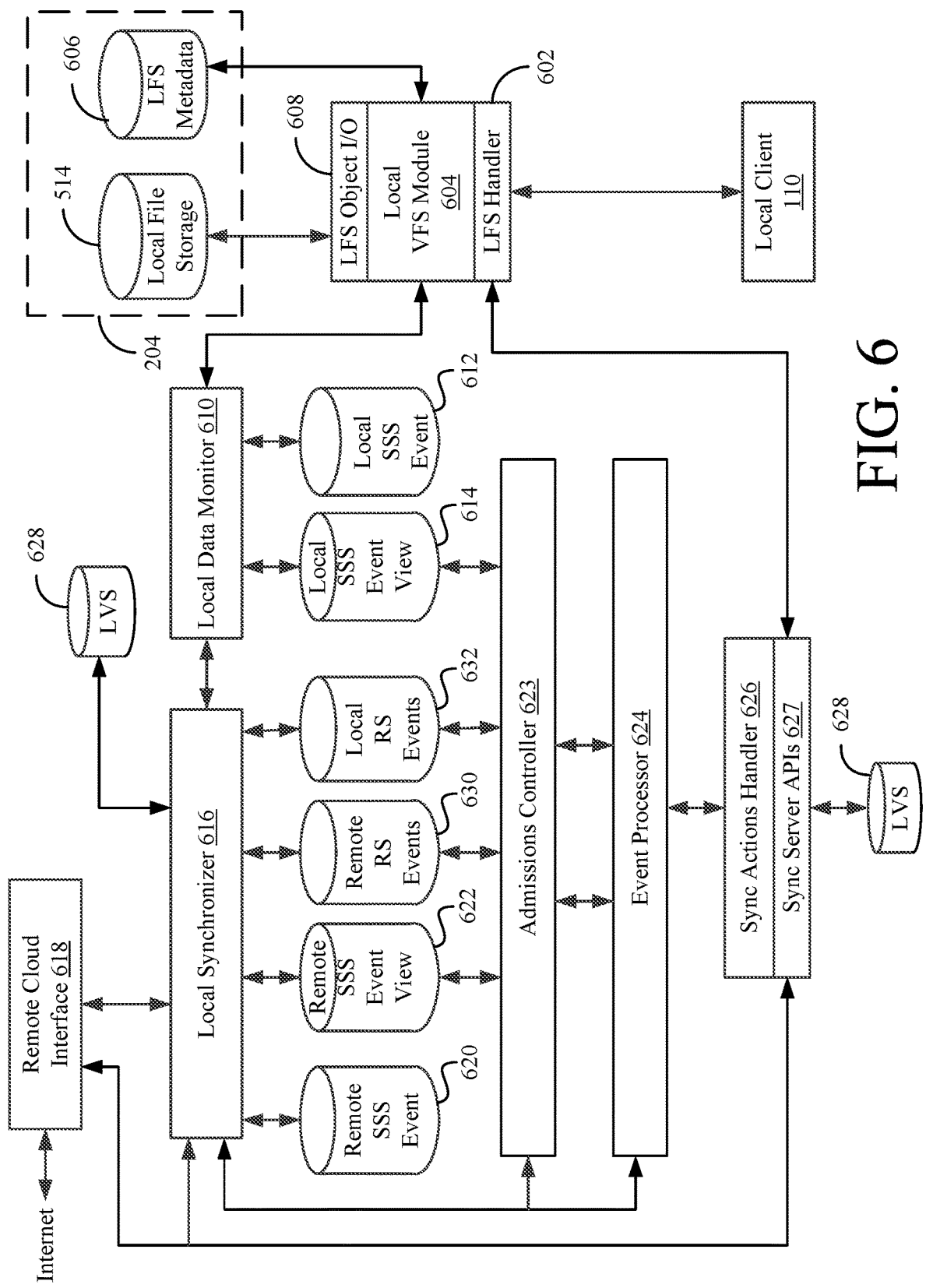
FIG. 6 is a relational diagram of the functional aspects of the local cloud storage server of FIG. 5.

FIG. 6 is a relational diagram of the functional aspects of local cloud server 104. In this illustrated embodiment, the functional aspects are provided by local cloud services 512 but can be distributed across other service modules or even other machines.

LFS handler 602 receives requests for access (e.g., read requests, write requests, etc.) from local users 110. In this particular example, local users 110 are WINDOWS® clients, and LFS handler 602 is a server application that includes Samba which allows local cloud 104 to interact with the local users 110. However, the present invention is not so limited. Indeed, a significant advantage of the present invention is that it can be implemented with a wide variety of server applications and file system protocols (e.g., NFS).

Local client 110 is a device/process used to access the files in LFS 204 hosted by local cloud server 104. A user maps the "share" that is exported by LFS handler 602 (e.g., via Common Internet File System (CIFS), Server Messaging Block (SMB) protocol, etc.) and then accesses the files and folders within the exported share. In such an example, Samba could export the files and folders of LFS 306 to a Windows™ user via SMB or CIFS protocol.

Local VFS module 604 (e.g., a software plugin) that monitors I/O calls to LFS 204 to detect local SSS events (changes) being made to LFS 204. LFS object I/O module 608 manages the I/O subsystem for organized data file storage and access on LFS 204. Local VFS module 604 monitors the file system calls going to the local file system from the local users 110 based on the protocol that has been implemented. When local VFS module 604 detects a local SSS event (e.g., a change to LFS 204 made by local client 110), local VFS module 604 executes a trap that generates local SSS event information based on the local SSS event and provides the local SSS event information to local data monitor 610. The types of local SSS events are the same as the types of remote SSS events.

For each local SSS event, local data monitor 610 receives the local SSS event information from local VFS module 604, and then records the local SSS event in the local SSS event database 612. Optionally, local data monitor 610 can filter irrelevant and/or redundant local SSS events from database 612 (e.g., by implementing phase 0-1 processing as described below, etc.). Local data monitor 610 can also notify a local synchronizer 616 of a local SSS event and can receive synchronization commands from local synchronizer 616. Local data monitor 610 is also responsible for copying/moving local SSS events from local SSS event database 612 to a local SSS event view database 614 for synchronization purposes. In one embodiment, local data monitor 610 moves only local SSS events that occurred during an event synchronization period determined by local synchronizer 616.

Local SSS event database 612 provides storage for local SSS events in a scalable relational database structure. Records of local SSS events are stored in local SSS event database 612 in chronological order as local SSS events occur, but could be retrieved in any desirable order.

Local SSS event view database 614 stores local SSS events that will be undergoing synchronization. The data structure for database 614 is the same as for database 612, such that local SSS event information stored in database 612 can be easily copied/moved to database 614. Once local data monitor 610 moves the local SSS event from local database 612 to local SSS event view database 614, the local SSS events stores in local SSS event view database 614 are considered being processed for synchronization and are removed from local SSS event database 612 by local data monitor 610.

Local synchronizer 616 is responsible for driving the SSS and RS synchronization processes between the remote cloud 102 and the local cloud 104 in this embodiment. Accordingly, local synchronizer 616 periodically initiates synchronization, which it can do in a variety of ways. For example, local synchronizer 616 can initiate synchronization whenever local data monitor 610 notifies it of a local SSS event occurring. As another example, local synchronizer 616 can initiate synchronization periodically, for example, according to a time period defined by the client or by the system (e.g., every minute, every 15 minutes, etc.). As still another example, local synchronizer 616 can initiate synchronization upon receiving one or more remote SSS events from remote cloud 102, for example, via a connection established over internet 106 between local cloud interface 418 (FIG. 4) and a remote cloud interface 618. As yet another example, local synchronizer 616 can initiate synchronization upon receiving an indication that a rescan synchronization (e.g., an FFS, FRS, or LRS) is required. These and other methods by which local synchronizer 616 can initiate synchronization will be apparent in view of this disclosure.

Local synchronizer 616 periodically receives (and optionally requests) remote SSS events from remote cloud 102 over internet 106 and remote cloud interface 618. When remote SSS events are received, local synchronizer 616 stores the remote SSS events in a remote SSS event database 620. When synchronization is initiated, local synchronizer 616 copies at least some of the remote SSS events (e.g., those associated with an event synchronization period) in remote SSS event database 620 to a remote SSS event view database 622. Local synchronizer 616 then causes the copied remote SSS event records to be deleted from remote SSS event database 620. The data structures for remote databases 412, 620, and 622 are the same in the present embodiment.

In addition to the SSS process, the synchronizer 616 coordinates and carries out RS processes. In particular, local synchronizer 616 is operative to obtain a snapshot (e.g., the RFS Metadata 406) of RFS 202 and a snapshot (e.g., the LFS Metadata 606) of LFS 204, and stores each of the snapshots in the LFS 204 as a file. For example, local synchronizer 616 can request a metadata snapshot of RFS 202 from remote cloud 102 via remote cloud interface 618. Local synchronizer 616 can also obtain a metadata snapshot of LFS 204 via local data monitor 610 and local VFS module 604. Optionally, local synchronizer 616 can access LFS metadata 606 directly to obtain its metadata snapshot of LFS 204.

Local synchronizer 616 is also operative to compare the LFS and RFS snapshot files to ascertain differences between RFS 202 and LFS 204. Once the differences between RFS 202 and LFS 204 are ascertained, local synchronizer 616 generates the RS events required to bring RFS 202 and LFS 204 back into synchronization and stores information defining the RS events in the appropriate one of local RS events database 632 or remote RS events database 630. Remote RS events database 630 stores remote RS events that need to be applied to LFS 204, whereas local RS events database 632 stores local RS events that need to be applied to RFS 202.

In this embodiment, the types of local and remote RS events are a subset of the types of SSS events. In particular, the RS events include file and folder events. File RS events include, but are not limited to, CREATE, UPDATE, and UNLINK as described above. Folder RS events include, but are not limited to, MKDIR and RMDIR. In a particular embodiment, RS events do not include RENAME events, because RS events are generated by comparing snapshots of the two filesystems.

When comparing the remote and local snapshots, local synchronizer 616 generates the appropriate RS events based on the local and remote file systems described in the snapshots. For example, if folder/Shared/A existed in LFS 204 but not in RFS 202, then local synchronizer 616 would generate a local RS event to MKDIR/Shared/A in RFS 202. This would cause/Shared/A to be created in RFS 202 when this local RS event was translated into file system operation(s) and applied to RFS 202. Similarly, if RFS 202 included a file/Shared/B/xyz.docx and LFS included folder/Shared/B, but not file/Shared/B/xyz.docx, then local synchronizer 616 would generate a remote RS event to CREATE/Shared/B/xyz.docx. This would cause file Shared/B/xyz.docx to be copied (pulled) to LFS 204 when this remote RS event was translated into file system operations and applied to LFS 204. As is apparent, a great many RS events could be generated, especially during a FFS synchronization.

Local synchronizer 616 also communicates with an admissions controller 623 and an event processor 624 to carry out synchronization. In particular, local synchronizer 616 instructs admissions controller 623 to pass local and remote SSS and RS events from databases 614, 622, 630, and 632 to event processor 624, where the RS events are processed along with the SSS events, to generate file system operations. Admissions controller 623 passes the events to event processor 624 according to a bandwidth sharing scheme depending on a predefined service class associated with each event. Each service class is assigned a percentage of the available bandwidth depending on the respective importance of the events within the service class. In this particular embodiment, there are two predefined service classes. The first service class is for SSS events in databases 614 and 620, and the second service class is for RS events in databases 630 and 632. As will be described below, these service class definitions provide an important advantage, because steady state synchronization can continue even when a rescan synchronization is in progress, which results in much quicker access to LFS 204 by local clients 110. Processing the event streams based on bandwidth quotas also contains excessive resource and memory consumption.

The system can be configured to use a greater number of service classes if desired. As a generic example, the system could define four different service classes (A, B, C, and D). In this example, 70% of the processing bandwidth can be assigned to service class A, 15% of the processing bandwidth can be assigned to service class B, 10% of the processing bandwidth can be assigned to service class C, and 5% of the processing bandwidth can be assigned to service class D. In addition, service classes can be defined based on other factors and/or system characteristics including, but not limited to, file/folder owner, file size and last modification time. For example, files and folders that were modified within the last hour will have a higher urgency (and therefore priority) than files and folders that were modified three months ago. As another example, files that are greater than 10 GB will have a lower priority than files that are less than 25 MB. However the service classes are defined, once they are defined synchronization processing resources can be allocated among the defined service classes as desired.

The allocation of synchronization processing resources can be carried out in various ways. For example, the service period for a particular service class can be defined as a predetermined period of time. As another alternative, the service period allocated to a particular service class can be a fixed number of events. As yet other examples, the scheduling can be demand driven (based on ingest) or availability (all events of a service class scheduled). Choosing the particular scheduling mechanism facilitates time sharing of the synchronization bandwidth among the competing event streams, differentiating the allocation based on admission quota to the event processor.

Local synchronizer 616 also instructs event processor 624 to begin event processing. In some embodiments, local synchronizer 616 also receives communications from event processor 624. For example, event processor 624 can notify synchronizer 616 that event processing is completed for a current event synchronization period. In other embodiments, event processor 624 might provide file system operations to local synchronizer 616.

Event processor 624 carries out event-based processing on the local and remote SSS and RS events received from admissions controller 623. Event processor 624 processes the local and remote events into processed events and uses the processed events to generate file system operations that will be applied to RFS 202 and LFS 204 to synchronize the file systems. In this embodiment, event processor 624 outputs the generated file system operations to sync actions handler 626. (Optionally, event processor 624 could instead provide the file system operations to synchronizer 616 for conveying to remote cloud server 102.)

Sync actions handler 626 receives the file system operations and applies the file system operations to RFS 202 and LFS 204 using a set of sync server application program interfaces (APIs) 627. APIs 627 enable sync actions handler 626 to apply LFS file system operations to LFS 204 via LFS handler 602, for example with complementary APIs. APIs 627 also enable sync actions handler 626 to apply RFS file system operations to RFS 202 via remote cloud interface 618 and internet 106. Remote cloud server 102 then receives the file system operations via local cloud interface 418 (FIG. 4), for example via complementary APIs. Remote synchronizer 416 in turn applies the received file system operations to RFS 202 via RFS handler 402.

File system operations that can be applied to RFS 202 and LFS 204 include, but are not limited to, pushing (uploading) files and folders, pulling (downloading) files and folders, creating files and folders, moving files and folders, deleting files and folders, renaming files and folders, and any other desirable actions. It should also be noted that sync actions handler 626 can optionally use different APIs depending on the situation, including the number of file system operations that have to be applied, the number of files that have to be transmitted, the size of the files that have to be transmitted, etc.

Sync actions handler 626, via APIs 627, is also operative to update the last valid sync (LVS) database 628 as paths are successfully synchronized. LVS database 628 stores extended attributes (metadata) for every file system path that has been synchronized in LFS 204 and RFS 202 as of that file system object's last valid synchronization. Once a path is successfully synchronized, sync actions handler 626 will update the corresponding record in LVS database 628. Optionally, local synchronizer 616 can update LVS database 628 in addition to, or on behalf of, sync actions handler 626. If a synchronization fails at a later time, the records of the individually synced items can still remain in LVS database 628. However, in a particular embodiment, if a synchronization failure causes an RS to be triggered, then the LVS database 628 can be recreated from scratch. In another embodiment, an event feedback loop (EFL) can be used, where events for individual items that could not be synced (e.g., if a file was locked, etc) are stored for a particular sync period. The synchronization of these items can then be resumed in a subsequent sync period According to the invention, RFS 202 and LFS 204 can be efficiently and repeatedly synchronized by monitoring local and remote file systems for local and remote RS and SSS events, and then applying those events to the other file system. The inventors have found that this event-based synchronization process scales well to file systems uses fewer system resources. Moreover, because event-based synchronization can be performed often, the invention provides near steady-state synchronization between the RFS 202 and LFS 204.

Another important aspect of the invention is that the RS events are processed along with the SSS events by event processor 624 to generate file system operations. Moreover, the ability to define SSS events as one service class and RS events as another service class provides particular advantages. A complete RS (e.g., an FFS) can take a very long time (several days) to complete. In prior systems, the data on RFS 202 and LFS 204 would be unavailable to clients during a RS. Using separate service classes for SSS and RS allows the two types of synchronizations to occur simultaneously and makes RFS 202 and LFS 204 available to clients almost immediately.

As will be apparent from the description thus far, the described synchronization processes are primarily implemented and controlled by the local cloud server 104. However, the functional elements of the remote cloud 102 (FIG. 4) and the local cloud 104 (FIG. 6) could be reversed, such that the remote cloud primarily implements the steady-state synchronization. As another example, the functional elements of the local cloud 104 (FIG. 6) could be replicated on the remote cloud 102, such that either server could carry out the particular functions of steady-state synchronization as desired.

Figure 7A:
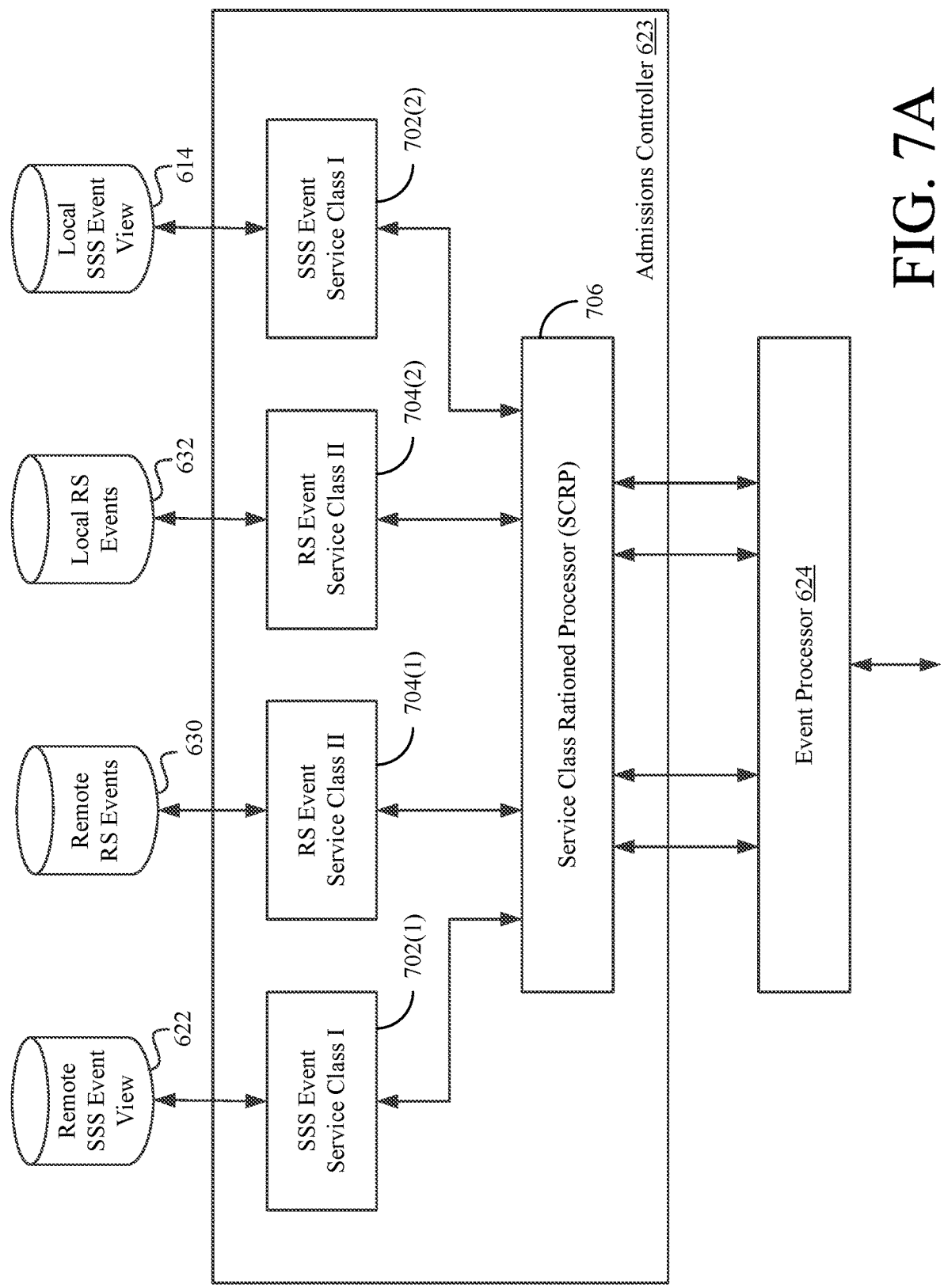
FIG. 7A is a relational diagram showing the functional aspects of the admission controller of FIG. 6 according to one embodiment of the invention.

FIG. 7A is a relational diagram showing admissions controller 623 in greater detail. Generally, the functions of the admission controller 623 are three fold. The admissions controller 623 decides how much synchronization bandwidth is to be given to each service class. Admissions controller 623 also ensures that the causal order of events is preserved during event processing. Third, admissions controller 623 consumes events from the databases 622, 630, 632, and 614 by providing an event stream to event processor 624.

Admissions controller 623 includes a pair of event service class I modules 702(1) and 702(2) that handle SSS events from remote SSS event view database 622 and local SSS event view database 614, respectively. In addition, admissions controller 623 includes another pair of event service class II modules 704(1) and 704(2) that handle RS events from remote RS events database 630 and local RS events database 632, respectively. Event service class I modules 702(1) and 702(2) and event service class II modules 704(1) and 704(2) query databases 622, 630, 632, and 614, respectively, for events, responsive to a service class rationed processor (SCRP) 706, and feed those events to SCRP 706. Event service class I modules 702(1) and 702(2) and event service class II modules 704(1) and 704(2) are shown as separate elements in FIG. 7A, but these modules could be implemented, for example, as part of the frontends of databases 622, 630, 632, and 614, respectively.

SCRP 706 accepts events from event service class modules 702(1), 702(2), 704(1), and 704(2) according to a predetermined bandwidth allocation scheme. In this particular example, service class I is defined as SSS events, and service class II is defined as RS events. Service class I is set as a higher priority than service class II, because SSS events relate to files and folders that are currently being used. The bandwidth of SCRP 706 is allocated based on demand. As long as there are SSS events to process, SCRP 706 accepts events from remote SSS event view database 622, via event service class I 702(1), and from local SSS event view database 614, via event service class I 702(2), until there are no more SSS events to process or until the service class I bandwidth percentage has been used. Then, SCRP 706 accepts events from remote RS events database 630, via event service class II 704(1), and from local RS events database 632, via event service class II 704(2), for a predetermined synchronization resource quota. The predetermined synchronization resource quota could correspond to a predetermined bandwidth percentage, a predetermined amount of time, a predetermined number of events, etc. After the allocated resource quota for RS events is used, SCRP 706 stops accepting RS events from event service class II 704(1) and event service class II 704(2), and resumes processing SSS events from event service class I 702(1) and event service class I 702(2), if any SSS events have accumulated in remote SSS event view database 622 or local SSS event view database 614.

If a rescan synchronization (RS) has occurred, then it is expected that remote RS events database 630 and local RS events database 632 will have a great many events waiting therein for processing. However, processing all of the RS events in remote RS events database 630 and local RS events database 632 would take so much time that processing of the more urgent SSS events would be effectively denied, potentially for several days. Accordingly, limiting the amount of SCRP 706 bandwidth allocated to RS events allows the more urgent SSS events to be processed and the RS events to be processed when bandwidth is available.

SCRP 706 takes into account that there may be causal relationships between events in different service classes. For example, when processing an event from remote SSS event view database 622, there might be events in remote RS events database 630, local RS events database 632, and/or local SSS event view database 614 that effect the processing of the event from remote SSS event view database 622. Therefore, when SCRP 706 accepts an event for processing, SCRP 706 also queries (e.g., via the service class modules 702 and 704) all of the databases for all events from all service classes that pertain to the path of the original event being processed, so that the related events can be processed together. This ensures that the causal ordering of events will always be preserved, even though it might cause some lower priority events (which are related to a higher priority event being processed) to be processed before some other higher priority events.

Events are also further prioritized within the service classes to improve synchronization and the apparent synchronization completion times. For example, the event service class modules 702(1), 702(2), 704(1), and 704(2) can be configured to prioritize the events they handle based on any aspect or attribute of those events including, but not limited to file or folder attributes such as size, extension (e.g., MIME type), owner, and/or last modification time. Such prioritization can be adjusted to the preferences/requirements of a particular client.

Prioritization within service classes can be based on one or more of the following principles. For example, generally smaller files are interactively manipulated and, therefore, have a higher urgency for being synchronized. Large files, on the other hand, can generally tolerate a certain synchronization delay. By differentiating synchronization priority based on size, the apparent synchronization performance is improved, because smaller files required by customers for multi-site collaboration get synchronized faster. As another example, certain file types such as Microsoft Office files, PDF files, and JPG files tend to be collaborated on more often than file types such as virtual machine disk (VMDK) or .exe files. Giving higher priority to files that are likely to be shared improves the apparent synchronization performance. As yet another example, it is highly probable that the most-recently manipulated files will be acted upon sooner than files that have not been accessed for a greater amount of time. Therefore, by prioritizing synchronization based on modification time, the perceived synchronization performance increases.

Events within a service class can also be prioritized based on whether or not they affect the synchronized namespace. Events that result in metadata operations can have the same (highest) priority for synchronization purposes. However files can be either synchronized, for example, by extension (MIME type) or by time stamp. When synchronizing by MIME type, different priorities for synchronization (selectable by the customer) can be assigned. Furthermore, the smallest files can be synchronized first. As an example of this, the customer can choose to synchronize .mp3 and .jpg files first and .mov and .mp4 files second such that all .mp3 and .jpg files would be synchronized before the .mov and .mp4 are considered for synchronization.

Figure 7B:
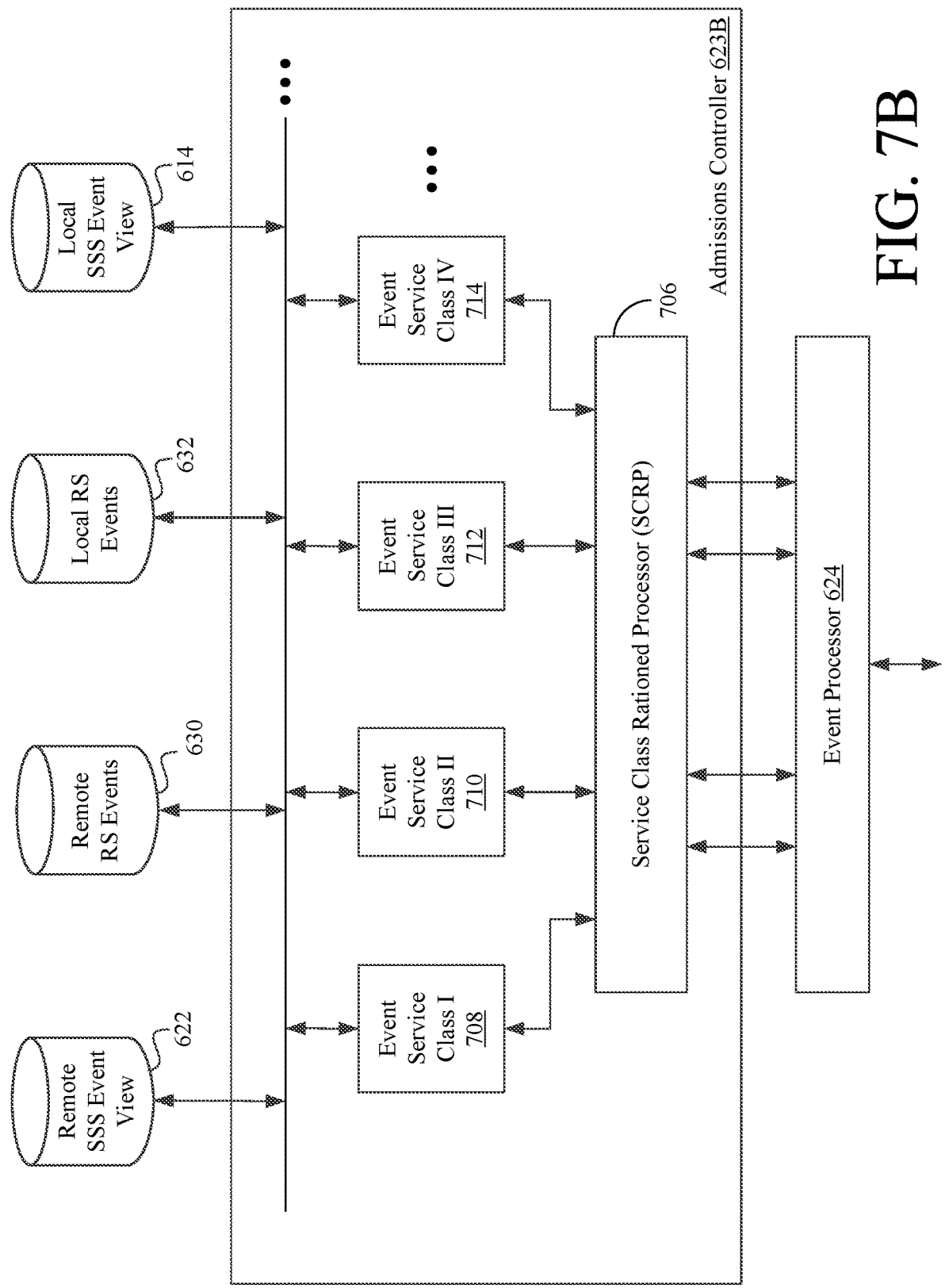
FIG. 7B is a relational diagram showing the functional aspects of the admission controller of FIG. 6 according to another embodiment of the invention.

FIG. 7B shows an alternative admissions controller 623B including a plurality of event service class modules 708-714, each of which can access events in any of remote SSS event view database 622, remote RS events database 630, local RS events database 632, and local SSS event view database 614. FIG. 7B shows an example where a client can customize the service class definitions assigned to event service classes 708-716 and also customize the synchronization bandwidth assigned to each service class. For example, the client could define event service class I 708 to service SSS events, concentrating on the most recently-modified file system paths. Similarly, the client could assign event service class II 710 to RS events. The client could also assign event service class IIII 712 to events associated with a particular file extension (e.g., MIME type) and event service class IV 714 to events associated with a particular owner or group. The client could also assign event processing bandwidths for SCRP 706 of 60%, 30%, 5%, and 5% to event service classes I-IV 708-714, respectively. As discussed above, further prioritization can occur for events within each service classes 708-714. The ability for the client to define service classes and associated synchronization bandwidths provides the client with added flexibility in keeping its local and remote file systems synchronized based on what is important to the client. Furthermore, while four service classes are discussed, additional or fewer service classes can be implemented as desired.

Figure 8:
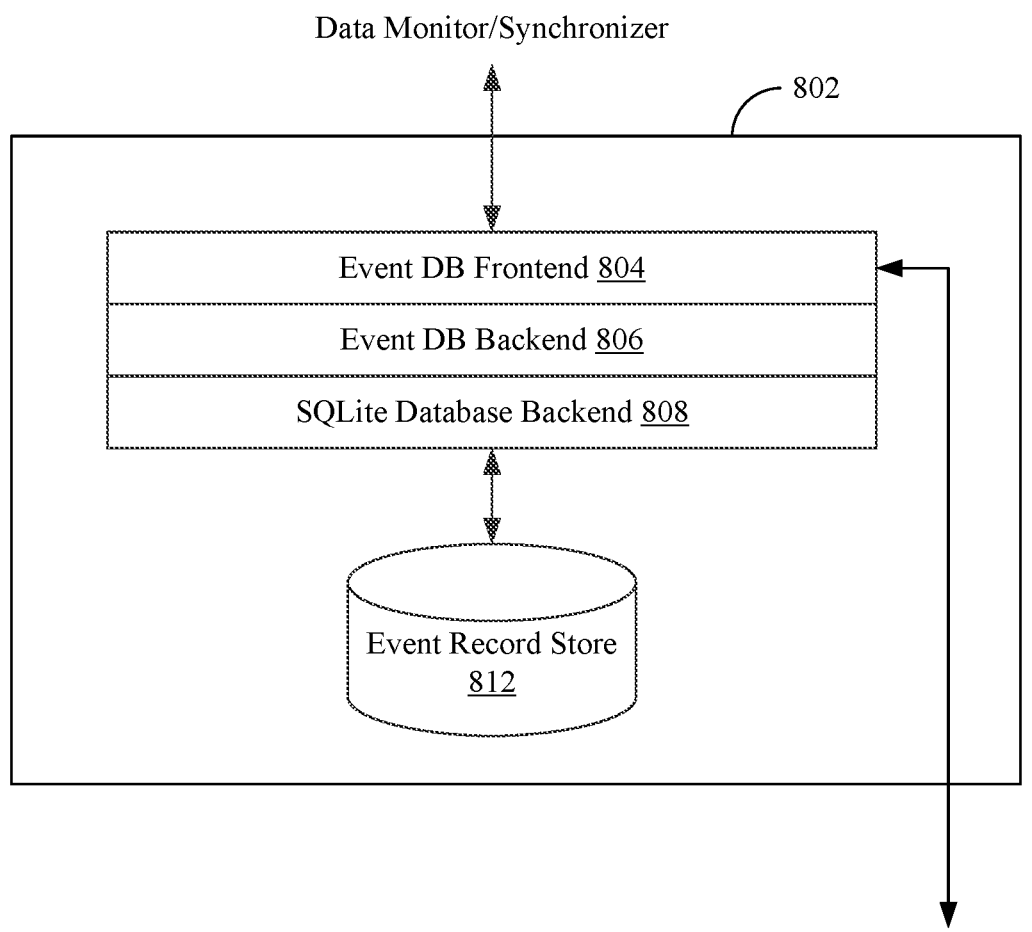
FIG. 8 is a relational diagram of the functional aspects of an event database according to the present invention.

FIG. 8 is a block diagram of the functional aspects of an exemplary event database 802 according to the present invention. Event database 802 can be employed as any of databases 412, 612-614, 620-622, and 630-632 shown in FIGS. 4 and 6-7. Event database 802 includes an event frontend 804, an event backend 806, an SQLite database backend 808, and an event record store 812.

Event frontend 804 provides an interface for event database 802 to interact with other elements of the system, such as data monitor 410/610, local synchronizer 616, admissions controller 623, and/or event processor 624. Event frontend 804 receives event information for new events and, in response, calls event backend 806 to create new records of the events in response to each event notification. Event frontend 804 can also receive records of events (e.g., in table format, etc.) and call event backend 806 to store the event information. Event frontend 804 also receives queries for event information from admissions controller 623 and is operative to retrieve the requested data from event backend 806 and provide the data to admissions controller 623. Event frontend 804 permits events to be stored in event record store 812 in chronological order and to be retrieved in some other order (e.g., as requested by admissions controller 623). Optionally, the functions of one or more event service classes (e.g., event services classes 702(1-2) and 704(1-2) shown in FIG. 7A, event service classes 708-714 shown in FIG. 7B, etc.) can be incorporated into event frontend 804.

Event backend 806 creates, stores, and retrieves records to and from event record store 812 using, in this embodiment, an SQLite database backend 808. SQLite database backend 808 is a self-contained, scalable, embedded database useful for event storage. As another option, database 802 could employ a flat file backend to facilitate encoding the database model as a single file.

To create a record of an event, event backend 806 receives event information from event frontend 804 and calls SQLite database backend 808 to create and store the record(s) for that event in event record store 812. Additionally, responsive to a query from event frontend 804, event backend 806 is operative to retrieve records from event record store 812 (via SQLite backend 808) and provide those records to event frontend 804. Event frontend 804, in turn, provides the records of the events to the requesting entity, such as data monitor 410/610, synchronizer 616, or admissions controller 623. In a particular embodiment, the query requests records for events associated with a particular attribute of the file system object, e.g., path, owner, size, etc.

Figure 9:
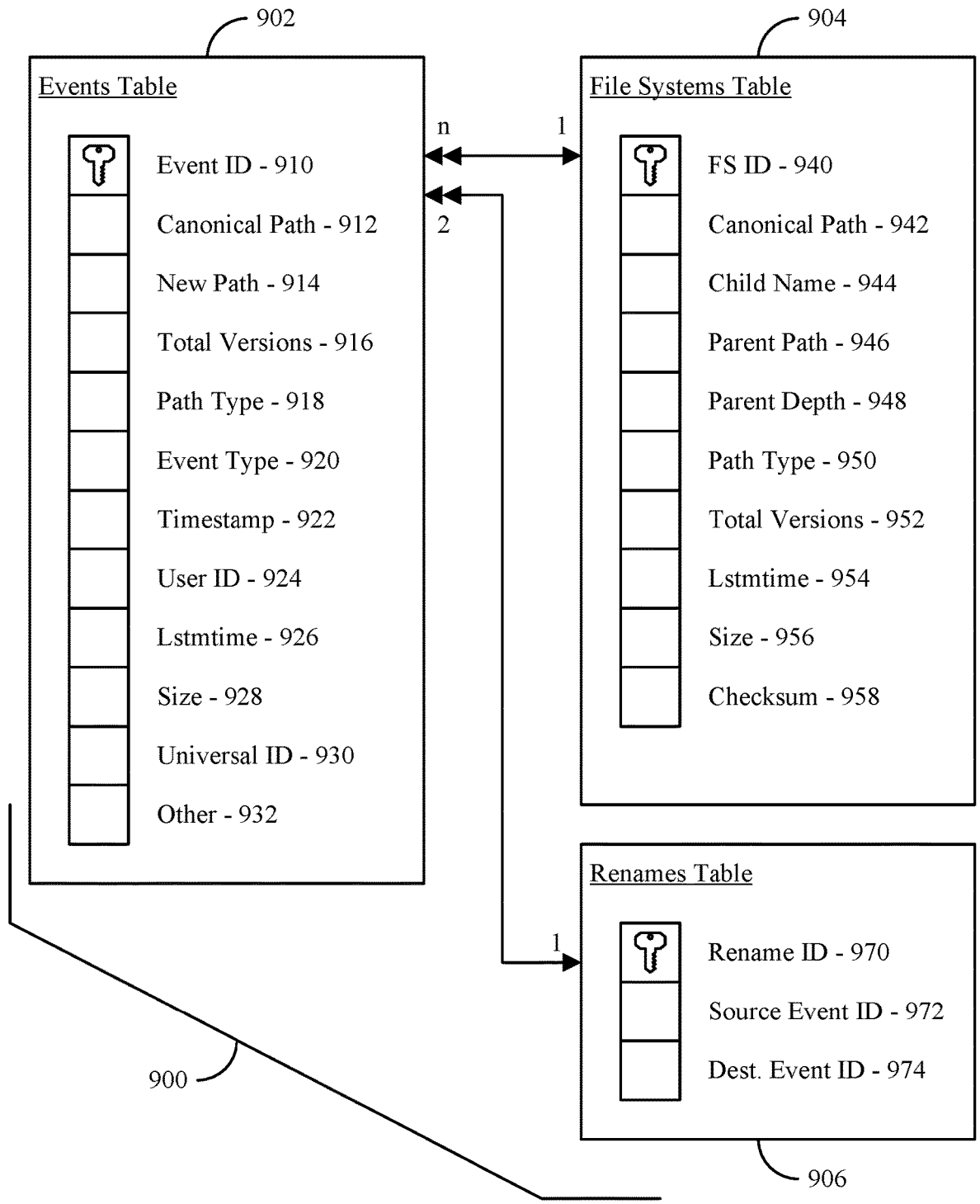
FIG. 9 shows the data structure for the event database(s) of FIG. 7.

FIG. 9 shows a data structure 900 for event database 802 according to the present invention. Schema 900 includes an events table 902, a file systems table 904, and a renames table 906. The tables 902, 904, and 906 are filled depending on the file system events that occur.

Each record in Events table 902 includes an Event ID field 910, a Canonical Path field 912, a New Path field 914, a Total Versions field 916, a Path Type field 918, an Event Type field 920, a Timestamp field 922, a User ID field 924, a Lstmtime field 926, a Size field 928, a Universal ID field 930, and an Other field 932. A record is created in Events table 902 for each event that occurs in an associated file system other than rename events. For rename events (file or folder), two event records 902 are created: one from the source path perspective and one from the destination path perspective.

Event ID 910 is a key field of events table 902 and includes data uniquely identifying the event record 902. Canonical Path field 912 includes data indicating a standardized path of the file system object on which the event occurred. For RENAME events, canonical path field 912 for the source event record will include the source path, whereas field 912 will include the destination path for the destination event record. Thus, path information can be accessed from both rename path perspectives. New Path field 914 includes data indicating a new path assigned to the file system object when an event occurred. Total Versions field 916 indicates how many versions of an associated file system object are kept in RFS 202. Path Type field 918 includes data (e.g., a flag) indicating if the event record is associated with a file or a folder. Event Type field 920 includes data indicating the type of event (e.g., CREATE, UPDATE, UNLINK, RENAME_SRC_FILE, RENAME_DST_FILE, MKDIR, RMDIR, RENAME_SRC_DIR, RENAME_DST_DIR) that the event record is associated with. Timestamp field 922 includes data indicating when the event occurred. User ID field 924 includes data identifying the user that caused the event. Lstmtime field 926 includes data indicating the time when the event on the associated file system object was completed (the last time the file system object was modified). Size field 928 includes data indicating the size of the file system object associated with the event. Size field 928 can optionally be set to zero (0) when the associated file system object is a folder. Universal ID field 930 includes data uniquely identifying the file system object. The identifier can be used, for example, to identify the same file system objects on different file systems (e.g., RFS 202 and LFS 204) and/or associate a virtual file system object (e.g., in metadata database 406) with the data file in the data store (e.g., in client data store 322). Other field 932 includes other data that might be useful during event processing (e.g., error information, reduction status, feedback, etc.).

Each record in File Systems table 904 includes a File System (FS) ID field 940, a Canonical Path field 942, a Child Name field 944, a Parent Path field 946, a Parent Depth field 948, a Path Type field 950, a Total Versions field 952, a Lstmtime field 954, a Size field 956, and a Checksum field 958. A record is created in File Systems table 904 for each path on which an event occurred. Accordingly, there is a many-to-one relationship between records in Events table 902 and records in File Systems table 904, such that many events can happen on one file system path. Storing the file system paths on which events occurred facilitates event processing.

File System (FS) ID field 940 is the key field of File Systems table 904 and includes data uniquely identifying the file systems record. Canonical Path field 942, Path Type field 950, Total Versions field 952, Lstmtime field 954, and Size field 956 include data as described above for Canonical Path field 912, Path Type field 918, Total Versions field 916, Lstmtime field 926, and Size field 928, respectively, of Events table 902. Child Name field 944 includes data representing the name of a child file system object to the path contained in Canonical Path field 942. Parent Path field 946 includes data representing the parent path of the path represented in Canonical Path 942. Parent Depth field 948 includes data indicating the depth of the path stored in Parent Path field 946. Checksum field 958 includes a checksum (e.g., Sha512, etc.) for the file system object, which can be used for comparison during synchronization of files.

Records are stored in Renames table 906 for all rename events. Rename events encompass both rename events and move events on file system objects. Each record in Renames table 906 includes a Rename ID field 970, a Source Event ID field 972, and a Destination Event ID field 974. There is a two-to-one relationship between records in Events table 902 and records in Renames table 906. Thus, two event records in Events table 902 (source and destination) are associated with each record in Renames table 906.

Rename ID field 970 is the key field of Renames table 906 and includes data uniquely identifying each rename record. Source Event ID field 972 contains data representing an Event ID identifying the source event record for the rename event. The source event record provides a record of the rename event from the perspective of the source path of the file or directory. Destination Event ID field 974 contains data representing an Event ID identifying the destination event record for the rename event. The destination event record provides a record of the rename event from the perspective of the destination path of the file or directory.

The following exemplary queries can be used to insert contents into the event database 802. To add an event record to Event table 902, the following query can be used:

```
add_event_query = u'''
    insert into event
        (canonical_path, new_path, total_versions, path_type,
        event_type, timestamp, user_id, lstmtime, size, universal_ID,
        other)
    values
        (X1, X2, X3, X4, X5, X6, X7, X8, X9, X10, X11)
'''
```

To add a file system record to File Systems table 904, the following query can be used:

```
file_system_query = u'''
    insert or replace into file_system
        (canonical_path, child_name, parent_path, parent_depth,
        path_type, total_versions, lstmtime, size, checksum)
    values
        (Y1, Y2, Y3, Y4, Y5, Y6, Y7, Y8, Y9)
'''
```

To add a rename record to Renames table 906, the following query can be used:

```
rename_event_query = u'''
    insert into rename_event
        (source_event_id, destination_event_id)
    values
        (Z1, Z2)
'''
```

Figure 10:
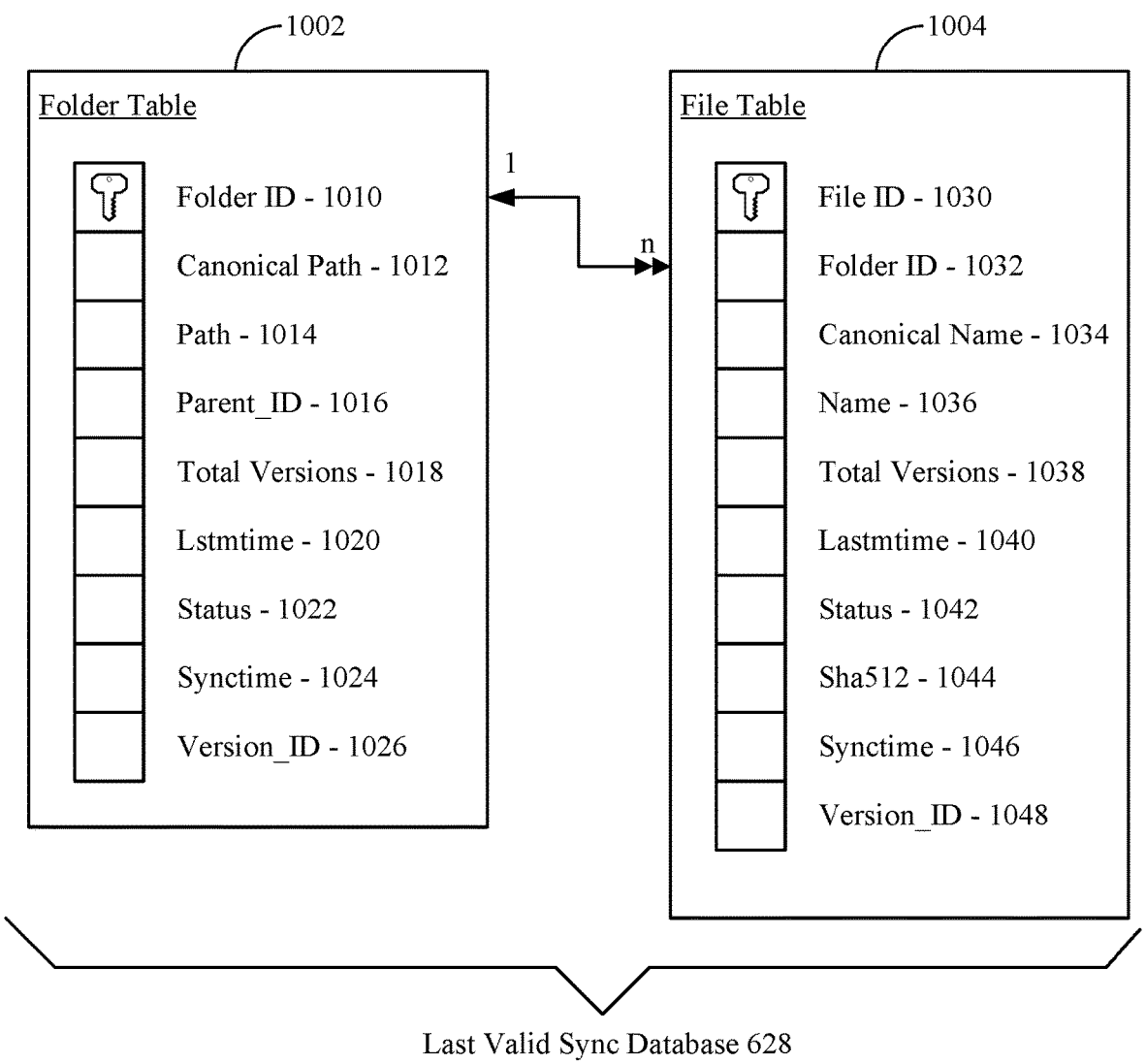
FIG. 10 shows the data structure for the Last Valid Sync (LVS) database of FIG. 6.

FIG. 10 shows a data structure for storing data in the Last Valid Sync (LVS) database 628. LVS database 628 contains the extended attributes related to file synchronization for each file and folder that is successfully synchronized on LFS 204 and RFS 202. Thus, each object in the file systems subject to synchronization will have an entry in LVS database 628, such that LVS database 628 can be rather large. As indicated above, local synchronizer 616 and/or sync actions handler 626 (via APIs 627) updates LVS 628 after each successful synchronization by creating records, deleting records, and/or populating records with the particular attribute information.

File systems are hierarchical, and relational databases are not very suitable for storing such large hierarchical data structures. When folder deletes and folder renames are executed in the relational database model, extensive searches and modifications are required for path prefixes. For large databases hosted on resource constrained storage appliances, these requirements are too prohibitive. Accordingly, LVS database 628 is split into two tables: a Folder Table 1002 and a File Table 1004. As a result, folder modifications only require search and processing of Folder Table 1002, and file modifications only require search and processing of the File Table 1004. Thus, the data structure of LVS database 628 greatly reduces the prefix search space and update operations, particularly for rename events. For example, if a folder containing multiple files only is being renamed, then only that particular folder record has to be renamed. This makes the data structure of LVS database 628 very efficient compared to a flat implementation in which every file entry would also have had to be renamed.

Each record of Folder Table 1002 represents a folder on the file system and includes a Folder ID field 1010, a Canonical Path field 1012, a Path field 1014, a Parent_ID field 1016, a Total Versions field 1018, a Lstmtime field 1020, a Status field 1022, a Synctime field 1024, and a Version_ID field 1026. Folder ID field 1010 is the key field that uniquely identifies the particular record. Canonical Path field 1012 includes a standardized path name, which can be used to match event(s) stored in the event database(s). Path field 1014 includes the local display path. Parent_ID field 1016 includes the Folder ID value of the parent folder of the folder represented by the current record. Total Versions field 1018 includes data indicative of how many versions of the folder will be kept on RFS 202. Lstmtime field 1020 includes data indicative of the last time the associated folder was modified. Status field 1022 includes data indicative of the synchronization status of the associated folder (e.g., synchronized, skipped, etc.). Synctime field 1024 includes data indicative of the last time the associated folder was successfully synchronized, or alternatively, the time (e.g., in seconds) on the client side needed for the last synchronization of the folder. Version_ID field 1026 includes data indicative of the current version of the associated folder.

Each record of File Table 1004 represents a file on the file system and includes a File ID field 1030, a Folder ID field 1032, a Canonical Name field 1034, a Name field 1036, a Total Versions field 1038, a Lstmtime field 1040, a Status field 1042, a Sha512 field 1044, a Synctime field 1046, and a Version_ID field 1048. File ID field 1030 is the key field that uniquely identifies the particular record. Folder ID field 1032 includes data identifying a record in folder table 1002 (the folder in which the file resides). Canonical Name field 1034 includes a standardized file name, which can be used to match event(s) stored in the event database(s) . . . Name field 1036 includes data indicative of the local display name. Total Versions field 1038 includes data indicative of how many versions of the file will be kept on RFS 202. Lstmtime field 1040 includes data indicative of the last time the associated file was modified. Status field 1042 includes data indicative of the synchronization status of the associated file (e.g., synchronized, skipped, etc.). Sha512 field 1044 includes a checksum of the record. Synctime field 1046 includes data indicative of the last time the associated file was successfully synchronized, or alternatively, the time (e.g., in seconds) on the client side needed for the last synchronization of the file. Version_ID field 1048 includes data indicative of the current version of the associated file.

LVS database 628 is used during rescan synchronizations. In particular, local synchronizer 616 utilizes the entries in LVS database 628 to determine if RS events need to be generated when an RS is triggered. For example, during an initial FFS, local synchronizer 616 would recognize that RS events need to be generated to synchronize the entire local and remote file systems, because no prior synchronization had occurred and no entries would be recorded in folder table 1002 or file table 1004 of LVS database 628. Accordingly, responsive to each path being synchronized during an FFS, sync actions handler 626 (or local synchronizer 616) would create a record in the appropriate one of folder table 1002 and file table 1004 of LVS 628 and fill the record with the appropriate attribute information (e.g., based on data contained in the metadata snapshot(s), based on the information obtained during synchronization, etc.).

For an FRS or LRS, where a prior synchronization had occurred, LVS database 628 will contain entries (from both the RFS 202 and LFS 204 perspectives) for a particular file system object. Accordingly, when local synchronizer 616 is generating the RS events for the FRS or LRS, local synchronizer 616 consults the folder and file entries in LVS database 628 for each path to be synchronized to determine if that path was synchronized in the past. If the path exists, local synchronizer 616 can compare the metadata in the LFS and/or RFS snapshots for the object to be synchronized with the extended attributes (metadata) in the LVS database 628 for that object. If the file system object has already been synchronized and has not been modified (e.g., based on a comparison of data in the metadata snapshot(s) and the Lstmtime field 1020), then an RS event does not need to be generated to synchronize that object again. As a result, LVS database 628 speeds up rescan synchronizations.

Sync actions handler 626 (via APIs 627) and/or local synchronizer 616 are operative to update LVS 628 after each successful synchronization by creating entries, deleting entries, and/or populating entries with the particular attribute information. Entries would be created or updated in folder table 1002 and file table 1004 to reflect successful folder and file synchronizations, respectively. Similarly, records in folder table 1002 and file table 1004 would be deleted when a corresponding path was removed from RFS 202 and/or LFS 204. It should be noted that entries in LVS database 628 are updated as file system objects are synchronized, whether it result from a rescan or steady state synchronization process.

Other attributes in folder table 1002 and file table 1004 can also be used by sync actions handler 626 and/or local synchronizer 616 to optimize and enhance rescan and/or steady-state synchronizations. For example, the checksum information in Sha512 1044 can be used to verify that a file copies to a new file system correctly during either RS or SSS event processing. As another example, the information in Synctime field 1024 can be used to estimate how long a particular synchronization operation should take. If synchronization is taking significantly longer, it might be desirable to abort synchronizing the particular file system object until a later time.

The following are examples of how records can be created in LVS database 628. Assume that a folder "/Shared/X" that does not exist in LFS 204 is created in RFS 202. An event is generated such that the folder is subsequently created in LFS 204. Upon successful folder synchronization, an entry is created in folders table 1002 of LVS database 628 containing the relevant metadata for this folder. For file synchronization and file record creation in file table 1004 of LVS database 628, the process is similar to folder synchronization. Additionally, if the folder containing the created file does not exist in the LVS database, an appropriate folder record in table 1002 is also created. Otherwise, the file record will be created and the existing folder record will be reused. Also, for file synchronization, a checksum (sha512) can be received from the remote cloud or calculated (if the file being synchronized exists in LFS) and saved in the file record.

As indicated above, LVS database 628 is useful for generating RS events during synchronization. During RS event generation, the data in the metadata snapshots of RFS 202, LFS 204, and LVS database 628 are examined. If a particular path exists in both RFS 202 and LFS 204, but not LVS database 628, then LVS database 628 is updated to reflect the synchronized path. If a particular folder or file path exists in both LFS 204 and LVS database 628, but not RFS 202, this indicates that an RS event should be generated to delete the path from LFS 204. Similarly, if a particular folder or file path exists in both RFS 202 and LVS database 628, but not LFS 204, this indicates that an RS event should be generated to delete the path from RFS 202. If a particular folder and/or file path exists in RFS 202 only, then this indicates that an RS event should be generated to create (pull) the file to and/or create the folder on LFS 204. Similarly, if a particular folder and/or file path exists in LFS 204 only, then this indicates that an RS event should be generated to create (push) the file to and/or create the folder on RFS 202.

LVS database 628 is also updated as SSS events are being processed and synchronizations complete. Furthermore, as indicated above, the checksum information in file records in LVS database 628 can be used to determine if a file has been modified since the last synchronization. If the checksums match, then the data file does not need to be transferred because its contents did not change since the last time the data file was synchronized.

In view of the above, LVS database 628 is a means to speed up the FRS and LRS processes and, in some cases, SSS event processing. It should be understood that the data structures of LVS database 628 can be customized to the particular application. Additionally, the LVS database 628 can be versioned or recreated (e.g., when a synchronization failure causes an RS to be triggered, every time a RS is being processed, etc.) as desired.

Figure 11:
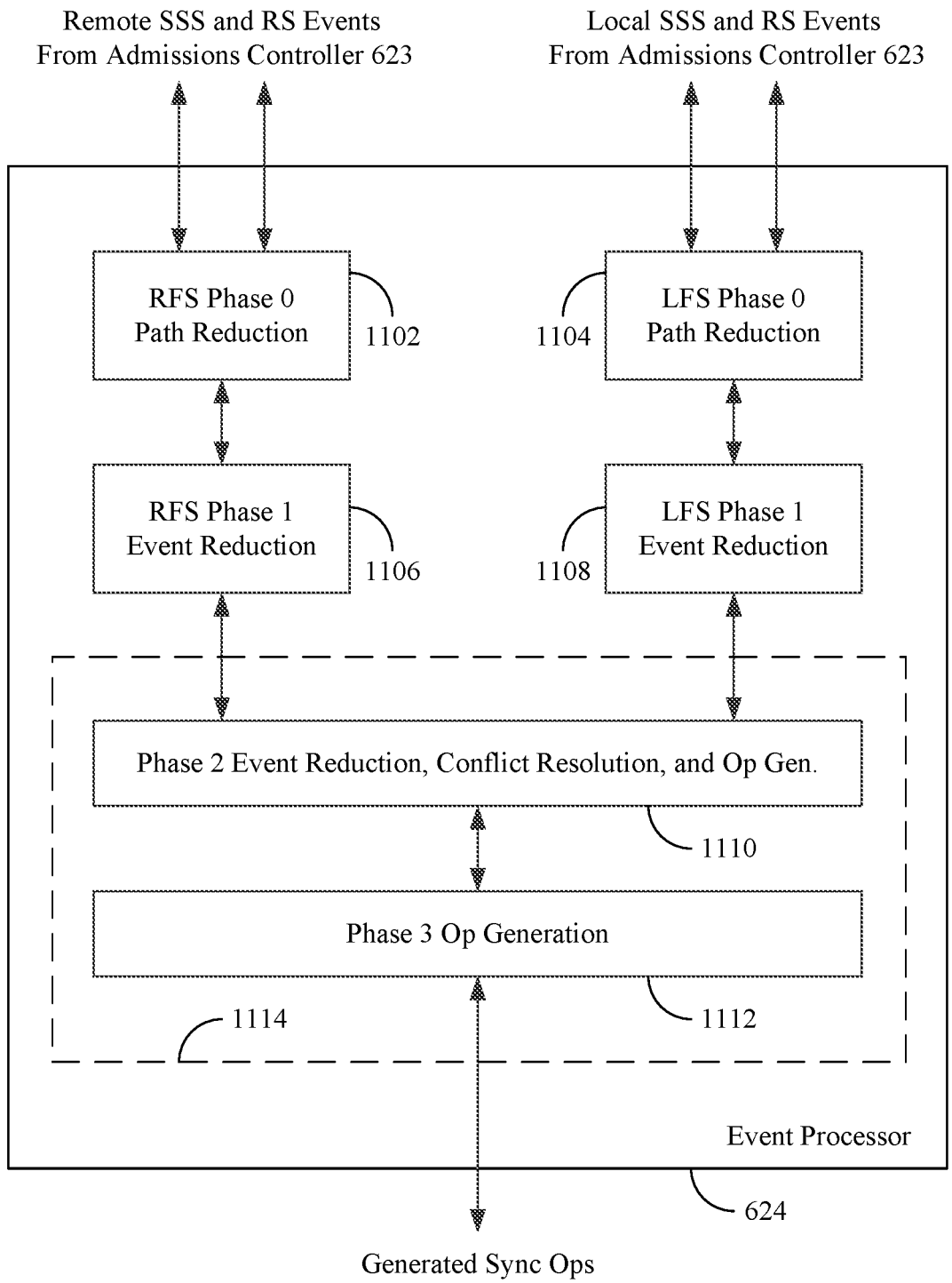
FIG. 11 is a relational diagram of the functional aspects of the event processor of FIG. 6.

FIG. 11 is a block diagram showing the functional aspects of event processor 624 in greater detail. Event processor 624 includes a series of processes (Phase 0 to Phase 3) that reduce, modify, and coalesce the LFS and RFS events received from admissions controller 623. The processed set of LFS and RFS events are used to generate file system operations that can be applied to RFS 202 and LFS 204 to synchronize RFS 202 and LFS 204. Event processor 624 includes an RFS phase 0 module 1102, an LFS phase 0 module 1104, an RFS phase 1 module 1106, and an LFS phase 1 module 1108. Event processor 624 also includes a phase 2 module 1110 and a phase 3 module 1112.

RFS phase 0 module 1102 receives a stream of remote events from admissions controller 623. This stream includes both remote SSS events from remote SSS event view database 622 and remote RS events from remote RS events database 630. The remote events are defined by the information (e.g., remote event records 902, file system records 904, and rename records 906) of remote SSS event view database 622 and remote RS events database 630. RFS phase 0 module 1102 performs various path reduction and modification processes on the remote events and provides them to RFS Phase 1 module 1106. RFS Phase 1 module 1106 receives the remote events, as modified by phase 0 module 1102, and performs further reduction of the remote events, for example, by utilizing a set of look-up tables.

LFS phase 0 module 1104 and LFS phase 1 module 1108 operate substantially the same way on the local events (defined by the local event records 902, file system records 904, and rename records 906) as received from admissions controller 623. Like module 1102, LFS phase 0 module 1104 receives a stream of local events from admissions controller 623, which includes both local SSS events from local SSS event view database 614 and local RS events from local RS events database 632. LFS phase 0 module 1104 performs various path reduction and modification processes on the local events, and subsequently, LFS Phase 1 module 1108 receives the modified local events and performs further local event reduction.

The phase 0 and phase 1 processes are performed on local events and remote events independently. The RFS and LFS phase 0 and phase 1 processes are, therefore, shown separately for clarity, but these modules can be combined into single phase 0 and phase 1 modules if desired, as long as the local and remote event streams are processed independently of each other during phase 0 and phase 1.

The modified local and remote event streams from RFS phase 1 module 1106 and LFS phase 1 module 1108 are then combined and processed further by phase 2 module 1110. Phase 2 module 1110 reduces the number of remote events and local events even further, if possible. Additionally, phase 2 module 1110 compares local and remote events that occur on common file system object paths in LFS 204 and RFS 202, and resolves conflicts (if any) between the local and remote events. In a particular embodiment, phase 2 module 1110 utilizes a series of lookup tables and APIs to resolve LFS-RFS event conflicts. As part of its process, phase 2 module 1110 generates file system operations that, when applied to RFS 202 and/or LFS 204, implement the conflict resolution.

Phase 3 module 1112 is utilized to generate file system operations based on the remaining local and remote events as discussed in more detail below. Because phase 2 module 1110 and phase 3 module 1112 both generate file system operations to be applied to RFS 202 and LFS 204, modules 1110 and 1112 can also be perceived as a single module 1114 and their respective functions can be implemented in combination.

While event processor 624 is described as processing streams of events initially supplied by admissions controller 623, it should be understood that event processor 624 can access remote SSS event view database 622, remote RS events database 630, local RS events database 632, and local SSS event view database 614 directly. For example, event processor 624 could access information in these databases based on, for example, record identifiers for tables 902, 904, and 906 provided by admissions controller 623.

Phase 0 event processing will now be described in greater detail. Phase 0 processing is based on the types of events that are received. In particular, files and/or folders on paths affected by RENAME and RMDIR events are subject to modification by Phase 0 processing. Because events are processed asynchronously, any events that happened inside or on the same affected event path might need to be modified. Accordingly, Phase 0 processing arranges the events in their causal order and applies the necessary changes to the events so that the events are relevant to the synchronization period. Since the events have lost their class identity when they are received from admissions controller 623, phase 0 modifications and reductions affect events of all classes.

Phase 0 path modification is carried out on SSS and RS events that happened on a path that was changed (renamed) at some time. The events whose paths are being modified will have a temporal precedence with regard to the rename event that necessitated the path modifications. Usually, the events being modified are those that occurred on the path prior to the rename event. Events that happened after the rename event generally remain unchanged. The following are examples of phase 0 path modifications for rename events:

(1) UPDATE/A/b.txt+RENAME/A to/B=RENAME/A to/B+UPDATE/B/b.txt (2) RENAME/A/B/c.txt to/A/B/C/d.txt+RENAME/A to/X=RENAME/A to/X+RENAME/X/B/c.txt to/X/B/C/d.txt In example (1), two events previously made to one file system (e.g., RFS 202) are shown on the left hand side (LHS) of the equation, and two modified events are shown on the right hand side (RHS) of the equation. On the LHS, an update event is followed by a rename event. Phase 0 module 1102 modifies the LHS events as shown on the RHS. In particular, phase 0 module 1102 chronologically moves the rename event ahead of the update event and moves the update event after the rename event, for example by modifying timestamp field 922 in the event records. Phase 0 module 1102 also modifies the path field 912 in the UPDATE event to reflect the new path. Thus, if the events on the RHS of example (1) were applied to a second file system (e.g., LFS 204), the second file system would be synchronized with the first file system.

In example (2), the two events on the LHS have been made to a first file system. In particular, a file "c.txt" has been renamed to "d.txt" and moved to a new directory by the first RENAME event. Note that the file RENAME event accomplishes both the rename and move tasks. The second RENAME changes the name of folder/A to/X. Phase 0 module 1102 modifies these events by chronologically moving the folder RENAME event ahead of the file RENAME event. Phase 0 module also modifies the paths for the file rename event records to reflect the prior folder RENAME event. Thus, if the events on the RHS of example (2) were applied to a second file system, the second file system would be synchronized with the first file system.

The following is exemplary pseudo-code for a phase 0 path modification algorithm.

```
for each rename_event in all RENAME events:
    reduce_timestamp = timestamp(rename_event)
    next_timestamp = reduce_timestamp + 1
    reduce_path = src_path(rename_event)
    translate_path = dst_path(rename_event)
    for event in all events sorted by timestamp:
        if event is DIR event: continue
        if event is UNLINK event: continue
        if event does NOT start with reduce_path: continue
        if timestamp(event) > reduce_timestamp: break
        if rename_event is a FILE event:
            if event is not a CREATE or UPDATE event: continue
            if path(event) != reduce_path: continue
        event.replace(reduce_path with translate_path)
        event.timestamp = next_timestamp
```

Phase 0 module 1102 performs the above algorithm for each rename event record in Renames table 906 (line 1). The algorithm determines when the rename even occurred and defines a subsequent time. The algorithm also determines the source path (e.g.,/A in example 1) and the destination path (e.g.,/B in example 1). Then, via the nested FOR loop, phase 0 module 1102 checks all the event records in table 902 in chronological order. Module 1102 determines the ones of the other event records containing the source path, and modifies those records that occurred before the rename event with the destination path. The algorithm also modifies the timestamps of those events such that they occur after the rename event.

Phase 0 module 1102 also checks for remove directory (RMDIR) events and deletes events that are no longer relevant in view of the RMDIR event. An example of this process is shown below:

(1) CREATE/A/a.txt+MKDIR/AB+CREATE/A/B/c.txt+RMDIR A=RMDIR A

On the LHS of the example, three events occur on folder A and then folder A is deleted in a first file system (e.g., RFS 202). Accordingly, phase 0 module 1102 deletes the three events occurring before the RMDIR A event. Thus, the only remaining event on the RHS is RMDIR A. When RMDIR A is applied to a second file system (e.g., LFS 204), the first and second file systems will be synchronized without a folder A. The following is pseudo-code for implementing this event reduction:

```
for rmdir_event in all events:
    rmdir_path = path(rmdir_event)
    rmdir_timestamp = timestamp(rmdir_event)
    for event in all events sorted by timestamp:
        if timestamp(event) > rmdir_timestamp: break
        if path(event) starts with rmdir_path: remove(event)
```

The above algorithm searches the event records in table 902 and returns each RMDIR event. For each RMDIR event, the algorithm determines the removed folder and the timestamp for the RMDIR event. Then, the algorithm searches through all events in table 902 for the particular folder by timestamp. If the event's timestamp is later than the timestamp of the RMDIR event, then the event record is left alone. However, if the event's timestamp is before that of the RMDIR event and if the event's path field 912 starts with or is a child of the deleted folder, then the event is removed.

Based on the above processes, RFS phase 0 module 1102 modifies paths and reduces remote SSS and RS events. LFS Phase 0 module 1104 modifies paths and reduces local events in substantially the same manner, as indicated previously.

Following phase 0 modification and reduction, RFS phase 1 module 1106 performs event reduction and modification on redundant remote events. Phase 1 event processing reduces consecutive and redundant events that happened on the same file system object path. The following are some examples:

(1) CREATE a.txt+UPDATE a.txt+UPDATE a.txt=CREATE a.txt.

(2) CREATE/A/a.txt+UNLINK/A/a.txt=NONE (3) RENAME/A to/B+RENAME/B to/C=RENAME/A to/C (4) RENAME/A to/B+RMDIR/B=RMDIR/A In example (1), the common file system object is a.txt. On the LHS, a.txt is created and then updated twice. RFS phase 1 module 1106 compresses these three events to one CREATE event on the RHS. In other words, the update events are deleted. This CREATE event will cause a.txt, in its most recent form, to be created on LFS 204.

In example (2), the common file system object is a.txt. On the LHS, a.txt is created and then deleted. Therefore, no action needs to be taken on the RHS (e.g., at the LFS 204), and RFS phase 1 module 1106 deletes the CREATE and UNLINK events.

In example (3), the common file system object is folder B. On the LHS, folder/A is renamed to folder/B and then folder/B is renamed to folder/C. RFS phase 1 module 1106 reduces these two events to a RENAME event from folder/A to folder/C. The intermediate rename event to folder/B can be eliminated. Folder/A will be renamed to folder/C on LFS 204.

In example (4), the common file system object is folder B. On the LHS, folder/A is renamed to folder B. Then, folder/B is deleted. RFS phase 1 module 1106 reduces these two events to RMDIR/A on the RHS. When RMDIR/A is applied to LFS 204, folder/A will be removed from LFS 204.

RFS phase 1 module 1106 operates as follows. When phase 1 reduction begins, RFS phase 1 module 1106 loops through the file system paths (e.g., from file systems table 904) for the events being processed. For each file system path, phase 1 module 1106 retrieves the associated event records 902 that occurred on that path and analyzes them in chronological order according to timestamp (timestamp field 922). For each two consecutive events, RFS phase 1 module 1106 determines the appropriate event reduction and modifies the event records accordingly. Thus, the number of event records can decrease as phase 1 processing progresses. Each reduced remote event record can then be used for a next event reduction determination on that file system path. Once all event reductions for events on a particular path are complete, RFS phase 1 module 1106 moves to the next file system path in table 804 and repeats the reduction process. When all file system paths have been processed, phase 1 reduction is complete.

The following is exemplary pseudo-code that implements phase 1 reduction.

```
reduce_events_for_path(event_list):
    path_list_to_reduce_events = empty_list
    for event in event_list:
        nreduced_events, path_list = reduce_two_events(event,
            event.next)
        if path_list: path_list_to_reduce_events.extend(path_list)
    return path_list_to_reduce_events
reduce_events(path_list):
    for path in all paths for which there are events:
        path_list_to_reduce_events =
            reduce_events_for_path(event_list(path))
path_list = reduce_events(all_paths)
while path_list is NOT empty:
    path_list = reduce_events(path_list)
```

LFS phase 1 module 1108 operates substantially the same as RFS phase 1 module 1106, except that it operates on the local events as previously modified by phase 0 module 1104. Optionally, RFS and LFS phase 1 modules 1106 and 1108 can be combined into a single module that performs phase 1 reduction, independently, on the remote events and the local events. Phase 1 event reductions are described in more detail with reference to FIGS. 10A-10D of U.S. Publication Nos. 2014/0040196 A1 and 2014/0040197 A1, which are incorporated by reference herein in their entireties.

After phase 0 and phase 1 processing, the remote and local events are merged and processed jointly by the phase 2 module 1110 according to file system object path. The phase 2 module 1110 reduces remote and local events associated with the same file system object, resolves conflicts between local and remote events on the same file system object, and generates file system operations according to the conflict resolution.

The phase 2 module 1110 reduces local and remote events in the following three cases:

(1) LFS MKDIR A+RFS MKDIR A=NONE
(2) LFS RMDIR A+RFS RMDIR A=NONE
(3) LFS UNLINK A+RFS UNLINK A=NONE

In each of these three cases, the same folder is made or deleted, or the same file is deleted, on both the LFS 204 and the RFS 202. Therefore, phase 2 module 1110 is able to remove these events.

Phase 2 module 1110 has another important function in that it resolves conflicts between local and remote events that happen on a common file system object. A conflict happens when file system operations on any specific path do not leave the event stream in a consistent state. To resolve these conflicts, phase 2 module 1110 utilizes conflict resolution look-up tables to determine the appropriate action. The tables for conflict resolution are described in detail with reference to FIGS. 11A-11D of U.S. Publication Nos. 2014/0040196 A1 and 2014/0040197 A1, previously incorporated by reference herein.

Phase 3 module 1112 generates file system operations based on the processed remote and local events produced by the phase 0-2 modules. The phase 3 module 1112 also integrates (e.g., chronologically, etc.) the file system operations generated by phase 2 module 1110 during conflict resolution into the file system operations that it will output. Phase 3 module 1112 then outputs a file system operation stream, including operations that it generated and operations that phase 2 module 1110 generated, to sync actions handler 626.

The following are examples of file system operations that can be generated by phase 3 module 1112 based on the processed local and remote event records.

(1) LFS UPDATE A+RFS UNLINK B=Push file A+Delete file B
(2) LFS RENAME A to B+RFS RENAME A to C=Push file B+Pull file C
(3) LFS MKDIR A+RFS UNLINK B+RFS RMDIR C= Push folder A+Delete file B+Delete folder C In the above examples, the operations for example (1) are generated by phase 3 module 1112, the operations for example (2) are generated by phase 2 module 1110, and the operations of example (3) are generated by phase 3 module 1112. Phase 3 module 1112 would assemble these file system operations into an operation output stream and provide that stream to sync action handler 626.

To generate file system operations, phase 3 module 1112 categorizes events into three categories. Those categories are independent events, simple dependent events, and complex dependent events. An independent event is an event whose path has no events in the other file system. For example, a local event is independent if there are no remote events for its path. Similarly, a remote event is independent if there are no local events for its path. All other events are dependent events. A simple dependent event is a local event for whose path there is only one RFS event. Similarly, a simple dependent event is also a remote event for whose path there is only one local event. An event that is not independent or simple dependent is complex dependent.

Phase 3 module 1112 generates file system operations directly for independent events. However, phase 3 module 1112 relies on the conflict resolution of phase 2 to generate file system operations for simple dependent events. For complex dependent events, phase 3 module 1112 collects the paths of the complex dependent events for rescan synchronizations of those paths. Phase 3 module 1112 can also initiates the rescan synchronizations, for example, with synchronizer 616 directly or in the operations stream. Phase 3 module 1112 also outputs the file system operation stream to sync actions handler 626 for the processed events generated during phases 0-3.

The following is pseudo-code to implement phase 3 processing:

```
gen_op(event):
    generate_operation(event)
    mark_as_processed(event)
collect_lrs_paths(event):
    collect the Limited Rescan Sync paths for event and all of its
    dependent events
    mark_as_processed(event and all its dependent events)
generate_operations(LFS events, CFS events)
    sort LFS and CFS events by timestamp
    for lfs_event in all non-processed LFS events:
        if is_independent_event(lfs_event): gen_op(lfs_event)
        elif is_simple_dependent_event(lfs_event):
            cfs_dep_event = get_dependent_event(lfs_event)
            for cfs_event in non-processed CFS events with
                timestamp < timestamp(cfs_dep_event):
                if is_independent_event(cfs_event):
                    gen_op(cfs_event)
```

```
        else:
            collect_lrs_paths(cfs_event)
        generate operations for simple dependent LFS/CFS events
            according to the LFS/CFS event conflict resolution tables
            presented in phase 2
    else: # the LFS event has more than one dependency
        collect_lrs_paths(lfs_event)
# process the remainder of CFS events
for cfs_event in all non-processed CFS events:
    gen_op(cfs_event)
ops = generate_operations(LFS events, CFS events)
performs_actions(ops)
if limited_rescan_sync_path_list is not empty:
    perform LRS on the limited_rescan_sync_path_list
```

Finally, it should be noted that the file system operations available to be output by event processor 624 will be determined by the application and file system protocols being used. However, it is expected that file system operations such as push, pull, delete, move, rename, etc. will be widely employed. Additionally, the file system operations that are used can also include operations to carry out or trigger other processes (e.g., FRS, LRS, modification of tables, etc.).

Some methods of the invention will now be described with reference to FIGS. 12-16. For the sake of clear explanation, these methods might be described with reference to particular elements discussed herein that perform particular functions. However, it should be noted that other elements, whether explicitly described herein or created in view of the present disclosure, could be substituted for those cited without departing from the scope of the present invention. Therefore, it should be understood that the methods of the present invention are not limited to any particular element(s) that perform(s) any particular function(s). Further, some steps of the methods presented need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 12:
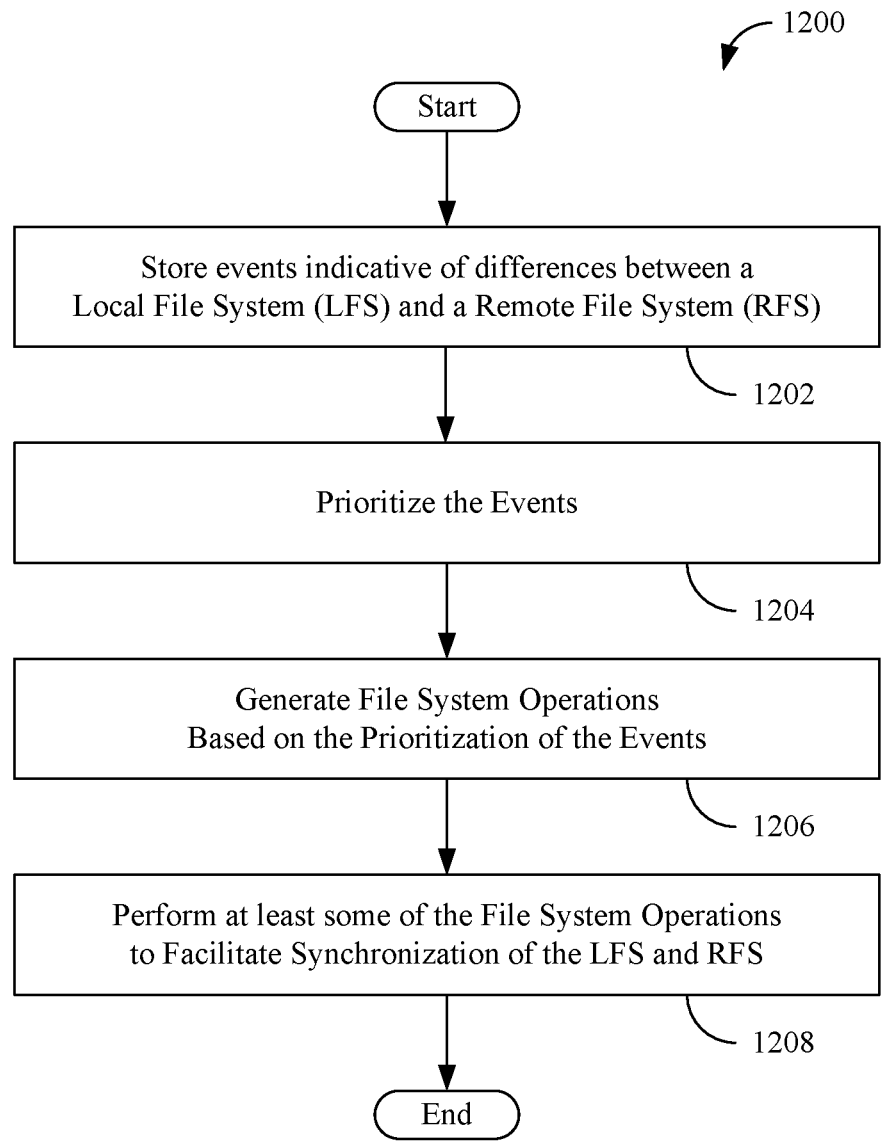
FIG. 12 is a flowchart summarizing a method for synchronizing a local file system and a remote file system according to the present invention.

FIG. 12 is a flowchart summarizing a method 1200 for synchronizing a local file system (LFS) 204 and a remote file system (RFS) 202 that is located remotely from the LFS 204. A first step 1202 including storing events in one or more databases, such as remote SSS event view database 622, remote RS events database 630, local RS events database 632, and/or local SSS event view database 614. The events are associated with file system objects of at least one of RFS 202 and LFS 204. Then, in a second step 1204, admissions controller 623 prioritizes the events, for example, based on service class. Then, in a third step 1206, event processor 624 generates file system operations based at least in part on the prioritization of the events and, in a fourth step 1208, sync actions handler 626 receives the file system operations and causes them to be performed to facilitate synchronization of RFS 202 and LFS 204.

Figure 13:
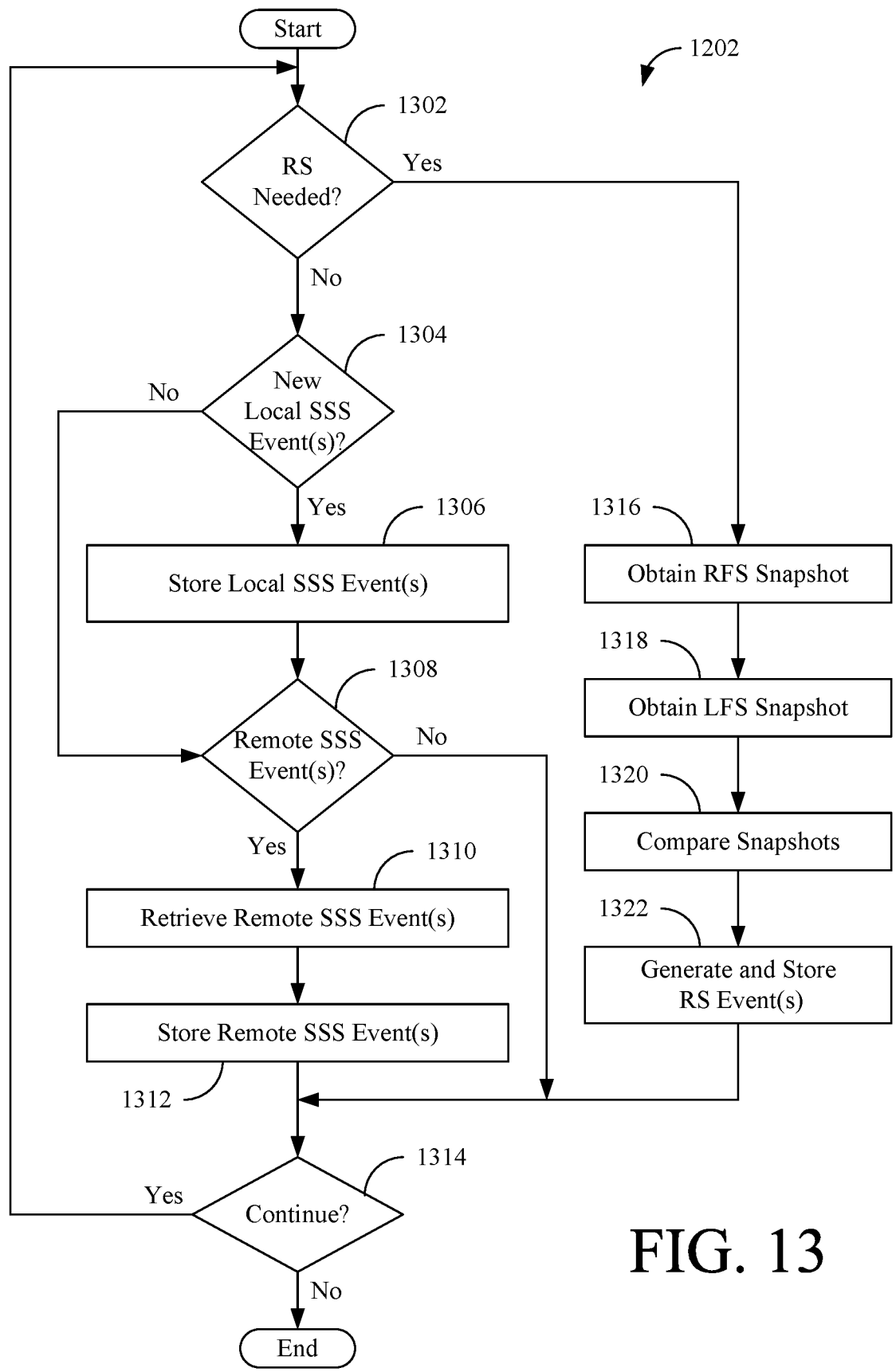
FIG. 13 is a flowchart summarizing a method of performing the first step of the method of FIG. 12.

FIG. 13 is a flowchart summarizing a method of performing the first step 1202 (store events) of method 1200. In a first step 1302, local synchronizer 616 determines if a rescan synchronization (RS) is needed. Local synchronizer 616 can make this determination, for example, by checking LVS database 628 for prior synchronization records. If no records exist, then a full file system (FFS) scan is needed. Alternatively, local synchronizer 616 would know that an RS was needed if sync actions handler 626 requested a full rescan sync (FRS) or limited rescan sync (LRS) in response to the processing events and communicated the request to local synchronizer 616. If an RS is not needed, then the method proceeds to a second step 1304 where local data monitor 610 determines if new local SSS event(s) have occurred. If local SSS event(s) have occurred, then local data monitor 610 stores information about the new local SSS event(s) in local SSS event database 612 (e.g., by storing data in each of events table 902, file systems table 904, and renames table 906) in a third step 1306. Once the local SSS event(s) are stored, or if there are no local events in step 1304, then the method proceeds to a fourth step 1308. In fourth step 1308, local synchronizer 616 checks with remote cloud server 102, via remote cloud interface 618, for new remote SSS event(s) that have occurred on RFS 202. If remote SSS have occurred, then in a fifth step 1310 local synchronizer 616 retrieves information about the new remote SSS events from remote cloud server 102 and stores the remote SSS events in remote SSS event database 620 (e.g., by storing data in each of events table 902, file systems table 904, and renames table 906) in a sixth step 1312. The method then proceeds to a seventh step 1314 where local synchronizer 616 determines if event storage should continue. If yes, then the method returns to first step 1302. If not, then the method ends.

If in first step 1302, local synchronizer 616 instead determines that an RS (e.g., any of an FFS, FRS, or LRS) is needed, then the method proceeds to an eighth step 1316. In step 1316, local synchronizer 616 obtains a metadata snapshot of RFS metadata 406 from remote cloud server 102 and stores the RFS metadata snapshot as a file in LFS 204. Local synchronizer 616 also obtains a metadata snapshot of LFS metadata 606 and stores the LFS metadata snapshot as a file in LFS 204 in a ninth step 1318. Then, in a tenth step 1320, local synchronizer 616 compares the metadata snapshots of RFS 202, LFS 204 and optionally prior synchronization information in LVS database 628 and, in an eleventh step 1322, generates and stores local and remote RS events to be applied to RFS 202 and LFS 204 in the appropriate RS events databases 630 and 632.

Figure 14:
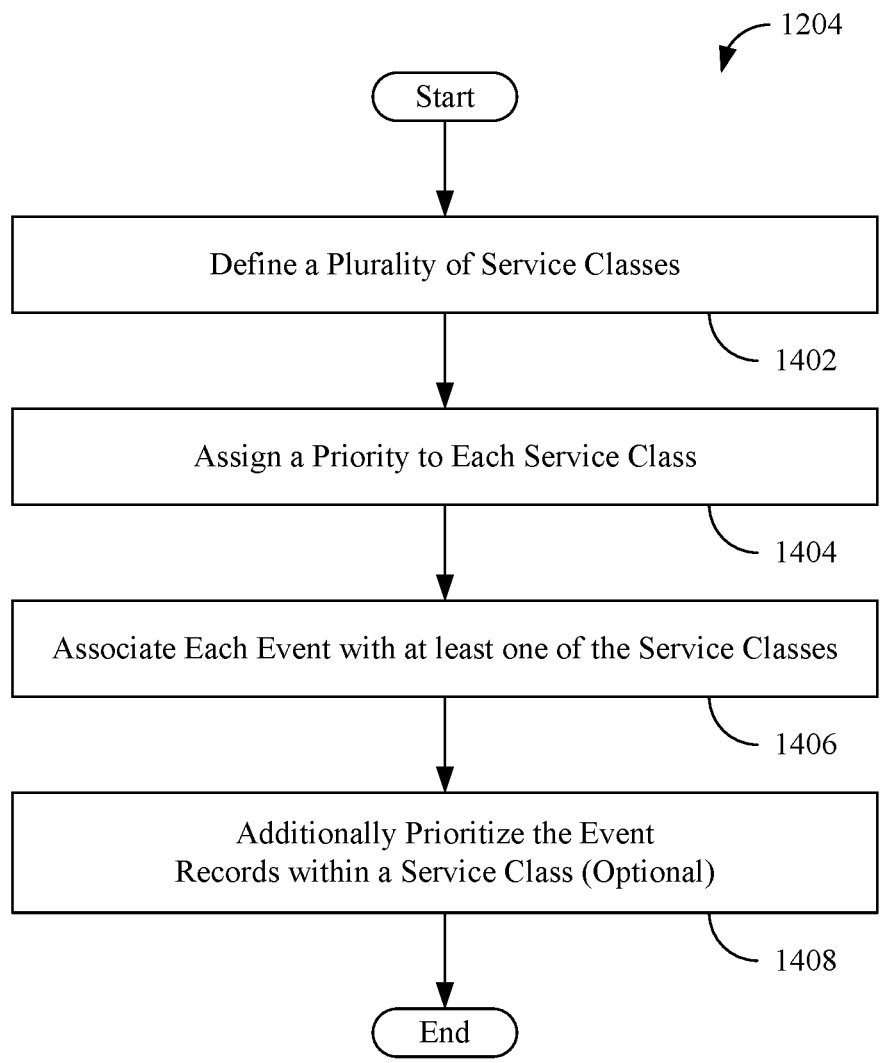
FIG. 14 is a flowchart summarizing a method of performing the second step of the method of FIG. 12.

FIG. 14 is a flowchart summarizing a method of performing the second step 1204 (prioritize the events) of method 1200. In a first step 1402, admissions controller 623 defines a plurality of services classes. For example, admissions controller 623 could define service classes according to event type (e.g., SSS events and RS events). As another example, admissions controller 623 could define services classes according to a particular attribute of the file system objects (e.g., last modified time, file type, file size, owner, etc.). Then, in a second step 1404, admissions controller 623 assigns a priority (e.g., a quota of synchronization processing bandwidth, etc.) to each service class. For example, admissions controller 623 could assign a higher priority (e.g., more bandwidth) to the first service class (e.g., SSS events) than the second service class (e.g., RS events). Then, in a third step 1406, admissions controller 623 associates each event with one of the services classes. Next, in an optional fourth step 1408, admissions controller 623 can further prioritize the events within a service class according to some secondary attribute of the events or associated file system objects (e.g., last modified time, file type, file size, owner etc.).

Figure 15:
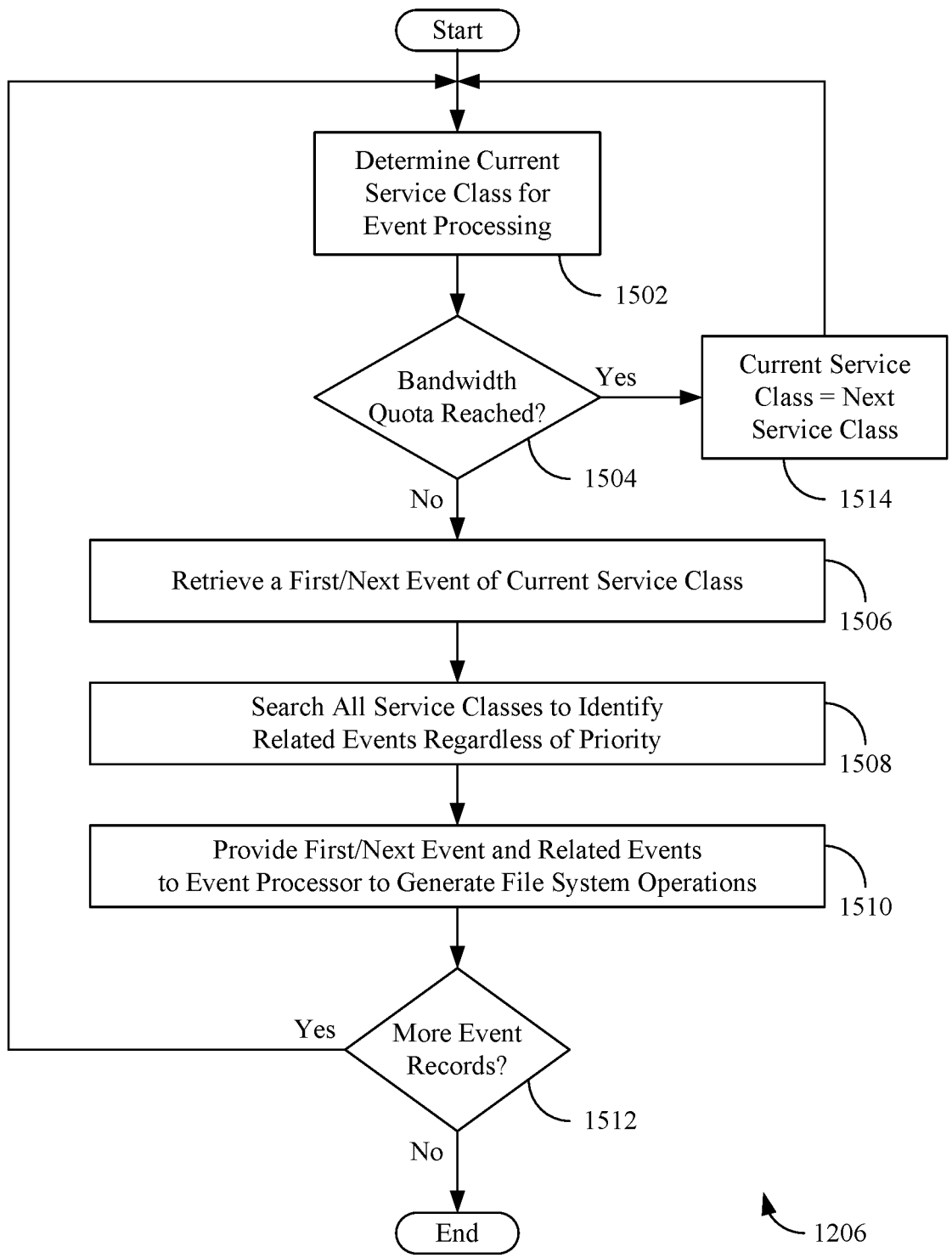
FIG. 15 is a flowchart summarizing a method of performing the third step of the method of FIG. 12.

FIG. 15 is a flowchart summarizing a method of performing the third step 1206 (generate file system operations based on prioritization) of method 1200. In a first step 1502, admissions controller 623 determines the current service class and, in a second step 1504, further determines if the synchronization bandwidth quota for the current service class has been reached. If no, then admissions controller 623 retrieves a first/next event of the current service class in a third step 1506. Then, in a fourth step 1508, admissions controller 623 searches the events of all services classes to identifies events that are related to the event being processed (e.g., events occurring on the same object path, events occurring on a path inside the event path, etc.) to preserve the causal relationship between events. Next, in a fifth step 1510, admissions controller 623 provides the first/next event and the related events to the event processor 624 such that the event processor 624 can generate the appropriate file system operations to apply to RFS 202 and/or LFS 204 based on the supplied events. Then the method proceeds to a sixth step 1512 where admissions controller 623 determines if there are more events to process. If yes, then the method returns to first step 1502. If no, then the method ends.

If, in second step 1504, admissions controller 623 determines that the synchronization bandwidth quote for the current service class has been reached, then admissions controller proceeds to a seventh step 1514. In seventh step 1514, admissions controller 623 moves to the next service class (e.g., the service class having the next highest priority). Thereafter, admissions controller 623 returns to first step 1502.

Figure 16:
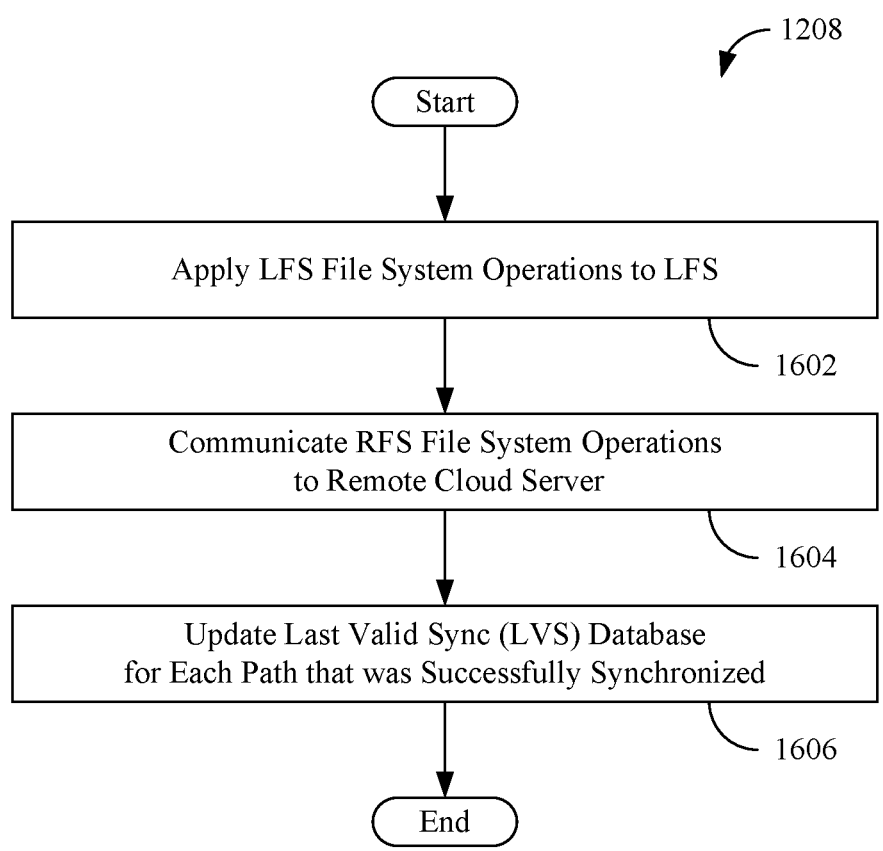
FIG. 16 is a flowchart summarizing a method of performing the fourth step of the method of FIG. 12.

FIG. 16 is a flowchart summarizing a method of performing the fourth step 1208 (perform file system operations) of FIG. 12. In a first step 1602, sync actions handler 626 applies file system operations associated with LFS 204 to LFS 204 using sync server APIs 627 and LFS handler 602. In a second step 1604, sync actions handler 626 communicates file system operations to be applied to RFS 202 to remote cloud interface 618 (or to local synchronizer 616) such that they are communicated to remote cloud server 102 and applied there. In a third step 1606, sync operations handler 626 (via APIs 627) and/or local synchronizer 616 updates LVS database 628 as each path on LFS 204 and RFS 202 (whether for folder or file object) is successfully updated.

The description of particular embodiments of the present invention is now complete. Many of the described features may be substituted, altered or omitted without departing from the scope of the invention. For example, functional modules described with respect to the local cloud can also be implemented in the remote cloud. One possible alteration could be implementing an event processor in the remote cloud services such that event reduction could be performed and/or file system operations could be generated by the remote cloud. As another example, an embodiment could be envisioned where the client can specify particular paths to fully rescan synchronize before implementing the service class prioritization described herein. These and other deviations from the particular embodiments shown will be apparent to those skilled in the art, particularly in view of the foregoing disclosure.

We claim:

1. A method for synchronizing a local file system (LFS) stored on a local file storage system and associated with a particular client of a geographically remote multi-tenant file storage system with a remote file system (RFS) stored on said multi-tenant file storage system, said method comprising:
   establishing a network connection between said local file storage system and said multi-tenant file storage system;
   obtaining a local metadata snapshot of at least a portion of said LFS;
   obtaining a remote metadata snapshot of at least a portion of said RFS;
   comparing said local metadata snapshot and said remote metadata snapshot to determine differences between said LFS and said RFS;
   generating rescan synchronization (RS) events, said RS events being indicative of said differences between said LFS and said RFS;
   generating steady-state synchronization (SSS) events responsive to changes being made to at least one of said LFS and said RFS, said SSS events being indicative of said changes;
   prioritizing said RS events and said SSS events, said prioritization influencing an allocation of computational resources between processing said RS events and processing said SSS events;
   generating file system operations for said RS events and said SSS events based at least in part on said prioritization of said RS events and said SSS events;
   causing at least a first portion of said file system operations to be applied to said LFS; and
   causing at least a second portion of said file system operations to be applied to said RFS.

2. The method of claim 1, wherein said step of prioritizing said events includes:
   assigning a first prioritization to one of said RS events or said SSS events;
   assigning a second prioritization to a remaining one of said RS events or said SSS events; and
   making said first prioritization a higher priority than said second prioritization.

3. The method of claim 2, wherein said step of assigning a first prioritization to one of said RS events or said SSS events includes assigning said first prioritization to said SSS events.

4. The method of claim 1, wherein said allocation of computational resources is defined by assigning a first number of events of said RS events and a second number of events of said SSS events to process during said step of generating file system operations.

5. The method of claim 1, wherein an allocation of computational resources is defined by assigning a first quota of processor time to processing said RS events and assigning a second quota of processor time to processing said SSS events during said step of generating file system operations.

6. The method of claim 2, further comprising:
   additionally prioritizing said RS events with respect to one another; and
   additionally prioritizing said SSS events with respect to one another.

7. The method of claim 6, wherein said steps of additionally prioritizing said RS events separately from said SSS events and additionally prioritizing said SSS events separately from said RS events includes prioritizing said RS events and said SSS events based on at least one file system attribute of file system objects associated with said RS events and said SSS events.

8. The method of claim 7, wherein said file system attribute is selected from the group consisting of file type, last modified time, ownership, and size.

9. The method of claim 1, wherein said step of generating file system operations further includes:
   obtaining an RS event;
   searching said SSS events;
   identifying an SSS event that is related to said RS event; and
   generating file system operations based on said RS event and said SSS event.

10. The method of claim 1, further comprising:
receiving a plurality of remote SSS events, each of said remote SSS events being indicative of at least one change to said RFS; and wherein
said step of generating steady-state synchronization (SSS) events responsive to changes being made to at least one of said LFS and said RFS includes generating SSS events responsive to changes being made to said LFS.

11. A file storage system operative to synchronize a local file system (LFS) with a remote file system (RFS) associated with a particular client of a multi-tenant file storage system, said local file storage system comprising:
at least one hardware processor electrically coupled to execute a set of predefined instructions configured to cause said at least one hardware processor to perform a corresponding set of operations;
memory electrically coupled to said at least one hardware processor, said memory storing code and data, said code including at least said set of predefined instructions and said data including at least one of said LFS and said RFS;
a network adapter electrically coupled to establish a network connection with a geographically remote file storage system;
a rescan synchronizer including
a first subset of said set of predefined instructions configured to obtain a local metadata snapshot of at least a portion of said LFS,
a second subset of said set of predefined instructions configured to obtain a remote metadata snapshot of at least a portion of said RFS,
a third subset of said set of predefined instructions configured to compare said local metadata snapshot and said remote metadata snapshot to determine differences between said LFS and said RFS, and
a fourth subset of said set of predefined instructions configured to generate rescan synchronization (RS) events, said RS events being indicative of said differences between said LFS and said RFS;
a steady-state synchronizer including a fifth subset of said set of predefined instructions configured to generate steady-state synchronization (SSS) events responsive to changes being made to at least one of said LFS and said RFS, said SSS events being indicative of said changes;
an event handler including
a sixth subset of said set of predefined instructions configured to prioritize said RS events and said SSS events, said prioritization influencing an allocation of computational resources between processing said RS events and processing said SSS events, and
a seventh subset of said set of predefined instructions configured to generate file system operations for said RS events and said SSS events based at least in part on said prioritization of said RS events and said SSS events; and
an operations handler including
an eighth subset of said set of predefined instructions configured to cause at least a first portion of said file system operations to be applied to said LFS, and
a ninth subset of said set of predefined instructions configured to cause at least a second portion of said file system operations to be applied to said RFS.

12. The system of claim 11, wherein said event handler is additionally configured to:
assign a first prioritization to one of said RS events or said SSS events;
assign a second prioritization to a remaining one of said RS events or said SSS events; and wherein
said first prioritization is a higher priority than said second prioritization.

13. The system of claim 12, wherein said event handler is configured to assign said first prioritization to said SSS events.

14. The system of claim 11, wherein said allocation of computational resources is defined by assigning a first number of events of said RS events and a second number of events of said SSS events to be processed in alternating fashion during said step of generating file system operations.

15. The system of claim 11, wherein said allocation of computational resources is defined by assigning a first quota of processor time to processing said RS events and a second quota of processor time to processing said SSS events.

16. The system of claim 11, wherein said sixth subset of said set of predefined instructions is additionally configured to:
separately prioritize said RS events with respect to one another; and
separately prioritize said SSS events with respect to one another.

17. The system of claim 16, wherein said sixth subset of said set of predefined instructions is further configured to prioritize said RS events with respect to one another and prioritize said SSS events with respect to one another based on at least one file system attribute of file system objects associated with said RS events and said SSS events.

18. The system of claim 17, wherein said file system attribute is selected from the group consisting of file type, last modified time, ownership, and size.

19. The system of claim 11, wherein said seventh subset of said set of predefined instructions is further configured to:
obtain an RS event;
search said SSS events;
identify an SSS event that is related to said RS event; and
generate file system operations based on said RS event and said SSS event.

20. The system of claim 11, wherein:
said local file storage system and said multi-tenant file storage system are the same;
said LFS is stored on said geographically remote file storage system; and
said RFS is stored on said multi-tenant file storage system.

* * * * *